US008645092B2

(12) United States Patent
Manning et al.

(10) Patent No.: US 8,645,092 B2
(45) Date of Patent: Feb. 4, 2014

(54) QUALITY CONTROL SYSTEM AND METHOD FOR CONSTRUCTION, COMMISSIONING, AND OTHER INITIATION OF A PROCESS PLANT

(75) Inventors: Anthony J. Manning, Calgary (CA); Chuck Martyna, Calgary (CA)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1027 days.

(21) Appl. No.: 10/971,670

(22) Filed: Oct. 22, 2004

(65) Prior Publication Data

US 2006/0087402 A1  Apr. 27, 2006

(51) Int. Cl.
*G01N 37/00* (2006.01)

(52) U.S. Cl.
USPC .......................................................... 702/84

(58) Field of Classification Search
USPC .......................................................... 702/84
See application file for complete search history.

(56) References Cited

U.S. PATENT DOCUMENTS

| 6,298,454 | B1* | 10/2001 | Schleiss et al. | 714/37 |
| 7,191,021 | B2* | 3/2007 | Prasad et al. | 700/83 |
| 7,346,404 | B2* | 3/2008 | Eryurek et al. | 700/65 |
| 2002/0130846 | A1* | 9/2002 | Nixon et al. | 345/169 |
| 2007/0093929 | A1* | 4/2007 | Kreidler et al. | 700/169 |

OTHER PUBLICATIONS

WinPCS™ Project Completion System (PCS): A Commissioning and Mechanical Completion System, WinPCS Main Page, http://www.winpcs.com/main.htm, dated Nov. 9, 2004, 4 pages.
NOVA Chemicals—J2000 Project; Emerson Process Management—Industry Centers—Hydrocarbon and Energy—Success Sotry—NOVA Chemicals—J2000 Project; http://emersonprocess.com/solutions/performance/oilgas/success/success_story_2.asp, dated Nov. 9, 2004, 1 page.
Commissioning Documentation Assistant, Emerson Process Management brochure, 2 pages (2004).
A User Guide; "Process Plant Commissioning," Second edition, Institution of Chemical Engineers, (1998).

* cited by examiner

*Primary Examiner* — Aditya Bhat
(74) *Attorney, Agent, or Firm* — Marshall, Gerstein & Borun LLP

(57) ABSTRACT

Disclosed herein are a system and method useful for providing quality control services in connection with a project for initiation of a process plant having field devices disposed at respective field sites in the process plant. Quality control data is generated at the field sites with a portable computer in response to quality control task information provided via a user interface of the portable computer. The quality control data is transmitted to a host computer having a database with project history information, and stored in the database through integration of the quality control data with the project history information. The quality control data may be generated via check lists downloaded from the host computer to the portable computer, where the check lists specify tasks customized for the respective field site. Recordation of the quality control data via the check lists may include entering deficiency information. The initiation project may include commissioning of the process plant, and the project history information in the database may be made available for subsequent preventative maintenance or other work during operation of the process plant.

40 Claims, 18 Drawing Sheets

FIG. 9

| Subform | ▼ Result |
|---|---|
| AAH---80580 └ Task List | |
| 001-001-Review tu | Ok |
| 001-002-Tagging: | Yes |
| 001-003-Device ins | Yes |
| 001-004-Equipmen | Yes |
| 001-005-Device co | Yes |
| 001-006-Check sa | Ok |
| 002-001-Power up | |
| 002-002-Set up flo | |
| 002-003-Introduce | |
| Lookup: .................... | [Done] |

| 001-001-Review turn over ✓ ıck | |
|---|---|
| Pages | 1 of 6a |
| Tag Name | AAH-80580 |
| Heading | Inspection |
| Task Description | Review turn over p |
| Notes | .................... |
| Result Ok/NA | ↓ |
| Deficiencies | [Deficiency] |
| Photographs | [Photograph] |
| [End] | [◀◀] [◀] [▶] [▶▶] |

```
Signoff
Tag Name     AAH—80580
Check List ID  0

Signature     Unsigned
Signed Off By -Unassigned-
Date          -Set Date-

[Done]
[End]
```
— 162

FIG. 12A

```
001-001-Review turn over  ick
Pages            1 of 6
Tag Name         AAH-80580
Heading          Inspection
Task Description Review turn over p
Notes            
Result Ok/NA     ↓
Deficiencies    [Deficiency]
Photographs     [Photograph]

[End]  [◀◀] [◀] [▶] [▶▶]
```
— 164

FIG. 12B

```
Deficiencies
Tag Name    AIT-80181
Problem
DRAIN LINE NEEDS MORE BANDING IN
RACEWAY. IN THE CORNER BY THE
AIT. TUBING ALSO POORLY DONE IN
THIS SAME SPOT.
Solution

[End]        [Next]
```
— 166

FIG. 12C

```
Deficiencies
Criticality      A
Critical         ☐
Initiated By     10
Initiated Date   3/17/00
Responsibility   -Unassigned-
Desired Completion  -Set Date-
Photographs      [Photograph]

[End]  [Previous]  [Next]
```
—168

FIG. 13A

```
Subform
AIT-80181
 L Attachment

[Add]  Lookup:_____  [Done]
```
—170

FIG. 13B

```
Attachments
Tag Name    AIT-80181
Attachment  -Unassigned-

Press camera key to turn on camera,
or click Browse For File to attach an
existing file on the memory card.
[Camera off]

[Browse For File]
        [Delete Attachment]

[End]
```
—172

QUALITY CONTROL SYSTEM AND METHOD FOR CONSTRUCTION, COMMISSIONING, AND OTHER INITIATION OF A PROCESS PLANT

BACKGROUND OF THE INVENTION

1. Field of the Invention

The present invention relates generally to process control systems and, more particularly, to quality control in the construction, commissioning, and other initiation of plants and other facilities having process control systems.

2. Brief Description of Related Technology

Process control systems, like those used in chemical, petroleum or other processes, may be very complex, and typically include one or more centralized process controllers that are communicatively coupled to one or more host or operator workstations and to a large number of field devices. The field devices, which may be, for example, valves, valve positioners, transmitters, switches, sensors (e.g., temperature, pressure and flow rate sensors), and other field equipment, perform control functions within the process such as opening or closing valves and taking measurements of process parameters. In operation, the process controller receives signals indicative of process measurements made by the field devices and/or other information pertaining to the field devices, uses this information to implement a control routine and then generates control signals sent to the field devices to control the operation of the process. Information from the field devices and the controller is typically made available to one or more applications that are executed by the operator workstation to enable an operator to perform any desired function with respect to the process, such as viewing the current state of the process, modifying the operation of the process, performing diagnostic activities, optimizing the process, managing process alerts or alarms, carrying out batch activities, etc.

The plants and other facilities that implement and contain such process control systems are also often extremely complex. A typical plant for a large-scale process may have thousands of field devices connected in a network with tens of thousands of input/output (I/O) nodes. The construction and commissioning of the plant is an equally complex undertaking, requiring a great deal of resources, as well as resource planning and deficiency management.

Due in no small part to such complexity, construction and commissioning projects are often responsible for delayed startups and, more generally, present a number of problems for the owner or operator of the process plant. Plant commissioning is often incomplete due to poorly documented processes, inconsistent procedures, and inefficient project scheduling. Apart from poor documentation, safety of personnel is at risk when procedures are not followed. And the sheer size of the process plant can easily lead to inconsistencies in procedures or practices, as different technicians or other personnel proceed without coordination or clear directions. Despite the importance of quality control in construction and commissioning, hard-copy verification of work completed is inconsistently provided. Similarly, a typical construction and commissioning project may not include an independent auditing procedure, and sometimes no verification procedure at all. The lack of documentation evidencing that equipment was installed correctly may be outcome-determinative in connection with subsequent insurance claims. Without a clearly documented and controlled verification procedure, an insurance claim may fail when based on the assertion that steps were taken to ensure that the plant was set up properly prior to startup.

Generally, plant owners or operators want documented assurances that all of the equipment is installed correctly and tested, with any deficiencies documented or recorded, and personnel identified as accountable, or so-called sign-off accountablities. Unfortunately, however, often there is no clearly established procedures setting forth how the project will address or resolve such construction deficiencies. In fact, without sufficient documentation, an owner may have a more difficult time convincing a contractor that further work is required to repair or resolve the deficiency. If a contractor disputes a deficiency assertion, the contractor will at the very least want to inspect the field equipment prior to acknowledging that any work should be done, let alone acknowledging responsibility for the deficiency. This contractor resistance can introduce significant time delays and other project complications. Apart from deficiencies, such documentation should also include "as-built" information for all of the equipment. While perhaps not rising to the level of a deficiency, changes from the specification to the condition and characteristics of the equipment as installed may significantly impact subsequent operation and maintenance.

As a result of the aforesaid inconsistent practices and incomplete documentation, owners or operators are often left with the cost and hassle of doing work after commissioning to bring engineering information and installation up to a level that meets a corporate standard. Moreover, the lack of timely progress reports during the project have frustrated efforts to manage resources. An improved quality control solution is needed to address these inadequacies in past construction and commissioning projects and, in so doing, improve turnover documentation, establish and control well-defined, standardized commissioning procedures, and achieve a safe and efficient plant startup.

SUMMARY OF THE INVENTION

In accordance with one aspect, disclosed is a method useful for providing quality control services in connection with a project for initiation of a process plant having field devices disposed at respective field sites in the process plant. The method includes the steps of generating quality control data at the field sites with a portable computer in response to quality control task information provided via a user interface of the portable computer, transmitting the quality control data to a host computer having a database with project history information, and storing the quality control data in the database by integrating the quality control data with the project history information in the database.

In one embodiment, the method may include the step of storing the quality control task information in a memory of the portable computer to enable quality control work at the field sites. The quality control task information may include a check list for each respective field device, and the check list may be stored in the memory of the portable computer in association with equipment specification data for each respective field device. The generating step may include the step of entering comment data via the user interface for storage in the memory of the portable computer in connection with a task specified in the respective check list. The generating step may include the step of modifying the equipment specification data stored in the memory of the portable computer upon visual inspection of the field device. The method may also include the step of using the portable computer to select a respective field device by searching the memory of the portable computer based on one or more project criteria selected from the group consisting of plant, system, subsystem, equipment type, and equipment tag name. The generating step may include the steps of selecting a task from the check list for a respective field device and entering deficiency information associated with the task via the user interface for storage in the memory of the portable computer. The generating step may include the step of entering, via the user interface for storage in the memory of the portable computer, an indication that each task shown in the check list for a respective field device has been completed such that the quality control data includes a signoff indication for the respective field device.

In another embodiment, the quality control data may include a digital image of the respective field device such that the generating step includes the step of storing the digital image recorded by a digital camera of the portable computer in a memory of the portable computer. The digital image recording step may be performed in connection with a quality control problem such that the quality control data further includes textual description of the quality control problem.

In yet another embodiment, the storing step includes the step of synchronizing the quality control data with the project history information such that the quality control data overwrites portions of the project history information for a respective field device. The synchronizing step may include the step of exporting deficiency information stored in the database in association with respective field devices to a memory of the portable computer such that the deficiency information becomes a portion of the quality control task information available for display via the user interface of the portable computer. The synchronizing step may be implemented in accordance with rules specifying conditions under which the quality control data may overwrite portions of the project history information for a respective field device.

The project may include a commissioning project such that the project history information may include commissioning history information. The method may also include the step of utilizing the commissioning history information in a preventative maintenance system used during subsequent operation of the process plant.

The transmitting step may include the step of establishing communication between the portable computer and the host computer via an Internet connection.

In accordance with another aspect, a method is disclosed that uses a portable computer to facilitate quality control in connection with a project for initiation of a process plant having a field device disposed at a field site in the process plant. In the method, a quality control check list is displayed on a user interface of the portable computer at the field site, quality control data is recorded at the field site via the user interface by storing the quality control data in a memory of the portable computer, and the quality control data is transmitted from the portable computer to a host computer for quality control in connection with the project.

In one embodiment, the quality control check list is stored in the memory of the portable computer in association with equipment specification data for the field device. The recording step may involve modifying the equipment specification data stored in the memory of the portable computer upon inspection of the field device.

The method may also involve entering search criteria via the user interface to search the memory of the portable computer to select the field device wherein the search criteria are selected from the group consisting of plant, system, subsystem, equipment type, and equipment tag name.

The recording step may involve entering deficiency information associated with the field device via the user interface for storage in the memory of the portable computer.

The recording step may also involve entering, via the user interface for storage in the memory of the portable computer, an indication that each task shown in the quality control check list has been completed such that the quality control data includes a signoff indication for the field device.

In some cases, the quality control data includes a digital image of the field device such that the recording step includes the step of actuating a digital camera of the portable computer.

In one embodiment, the method includes the step of storing the quality control data in a memory of the host computer by integrating the quality control data into a project history database. The storing step may include the step of synchronizing the quality control data with the project history database such that the quality control data overwrites a portion of the project history database associated with the field device. The synchronizing step may be implemented in accordance with rules specifying conditions under which the quality control data may overwrite portions of the project history information for a respective field device. The synchronizing step may include the step of exporting deficiency information stored in the project history database in association with the field device to the memory of the portable computer such that the deficiency information is available for display via the user interface of the portable computer in connection with the quality control check list.

In one embodiment, the project may include a commissioning project such that the project history information may include commissioning history information. The method may include the step of utilizing the commissioning history information in a preventative maintenance system used during subsequent operation of the process plant.

The transmitting step may include the step of establishing communication between the portable computer and the host computer via an Internet connection.

In accordance with another aspect, a portable computer is disclosed for quality control in connection with a project for initiation of a process plant having field equipment at a field site. The portable computer includes a user interface suitable for operation at the field site, a processor communicatively coupled to the user interface, a memory communicatively coupled to the processor, a data collection routine stored in the memory and adapted for execution by the processor to display via the user interface a quality control check list for the field equipment and to store in the memory quality control data entered via the user interface and in accordance with the quality control check list, and a data transmission routine stored in the memory and adapted for execution by the processor to deliver the quality control data from the memory for recordation in connection with the project.

In some embodiments, the data transmission routine is further adapted to retrieve equipment specification data associated with the field equipment in connection with the quality control check list.

The portable computer may also include a communications port for wireless transmission of the quality control check list to another portable computer at the field site.

The user interface may include a digital camera such that the quality control data includes a digital image.

The portable computer may also include a wireless communication transceiver such that the quality control data is delivered wirelessly via an Internet connection.

The data collection routine may provide via the user interface a prompt for check list signoff such that the quality control data includes a signoff indication that the quality control check list has been fully completed.

The data collection routine may provide via the user interface a form for entering deficiency information indicative of a problem encountered during action taken in accordance with the quality control check list. The portable computer may also include an audio recorder communicatively coupled to the processor such that the data collection routine provides an option to record audio clips as the deficiency information.

In accordance with another aspect, disclosed is a system for quality control in connection with a project for initiation of a process plant having field equipment at field sites in the process plant. The system includes a host computer having a project history database, and a portable computer configured for communication with the host computer and having a user interface, a processor coupled to the user interface, and a memory coupled to the processor for execution of a quality control routine stored in the memory. The quality control routine includes a data synchronization routine to download, from the project history database to the memory, respective quality control check lists and equipment specification data for the field equipment and a data collection routine to record in the memory quality control data entered via the user interface in accordance with the quality control check lists.

In one embodiment, the data synchronization routine uploads the quality control data from the memory to the project history database.

BRIEF DESCRIPTION OF THE DRAWING FIGURES

For a more complete understanding of the invention, reference should be made to the following detailed description and accompanying drawing wherein:

FIG. 9 is an exemplary portable computer screen display of a checklist display form presented via a user interface of the portable computer of FIGS. 1 and 2 and used in connection with the data collection and transmission routines of FIG. 4;

FIG. 10 is an exemplary portable computer screen display of a task information display form presented via a user interface of the portable computer of FIGS. 1 and 2 and used in connection with the data collection and transmission routines of FIG. 4;

FIG. 11 is an exemplary portable computer screen display of a checklist signoff display form presented via a user interface of the portable computer of FIGS. 1 and 2 and used in connection with the data collection and transmission routines of FIG. 4;

Figure 1:
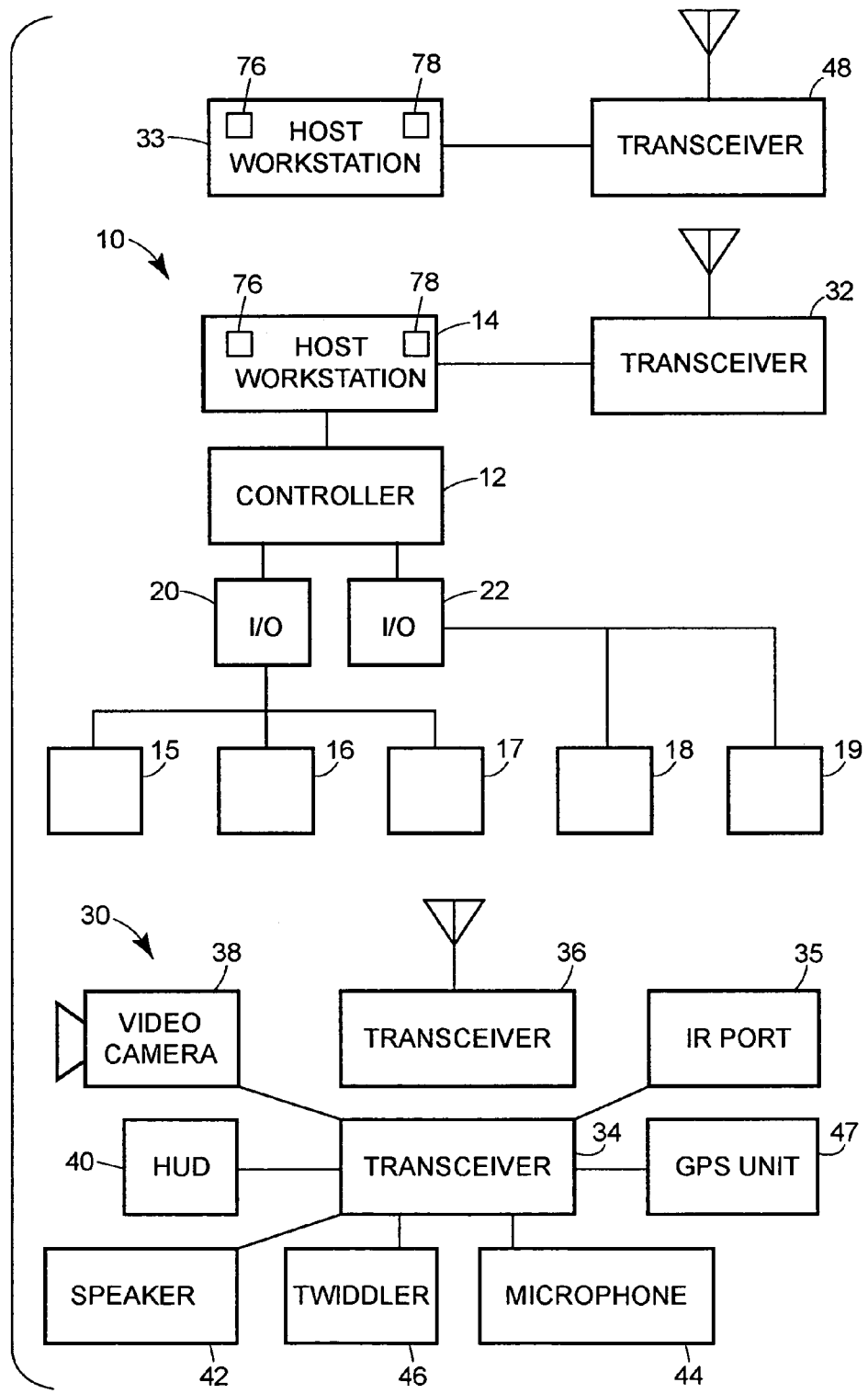
FIG. 1 is a schematic block diagram of a remotely coupled process control network of a process plant undergoing construction, commissioning and/or other initiation procedures, together with a host workstation and a portable computer.
Figure 2:
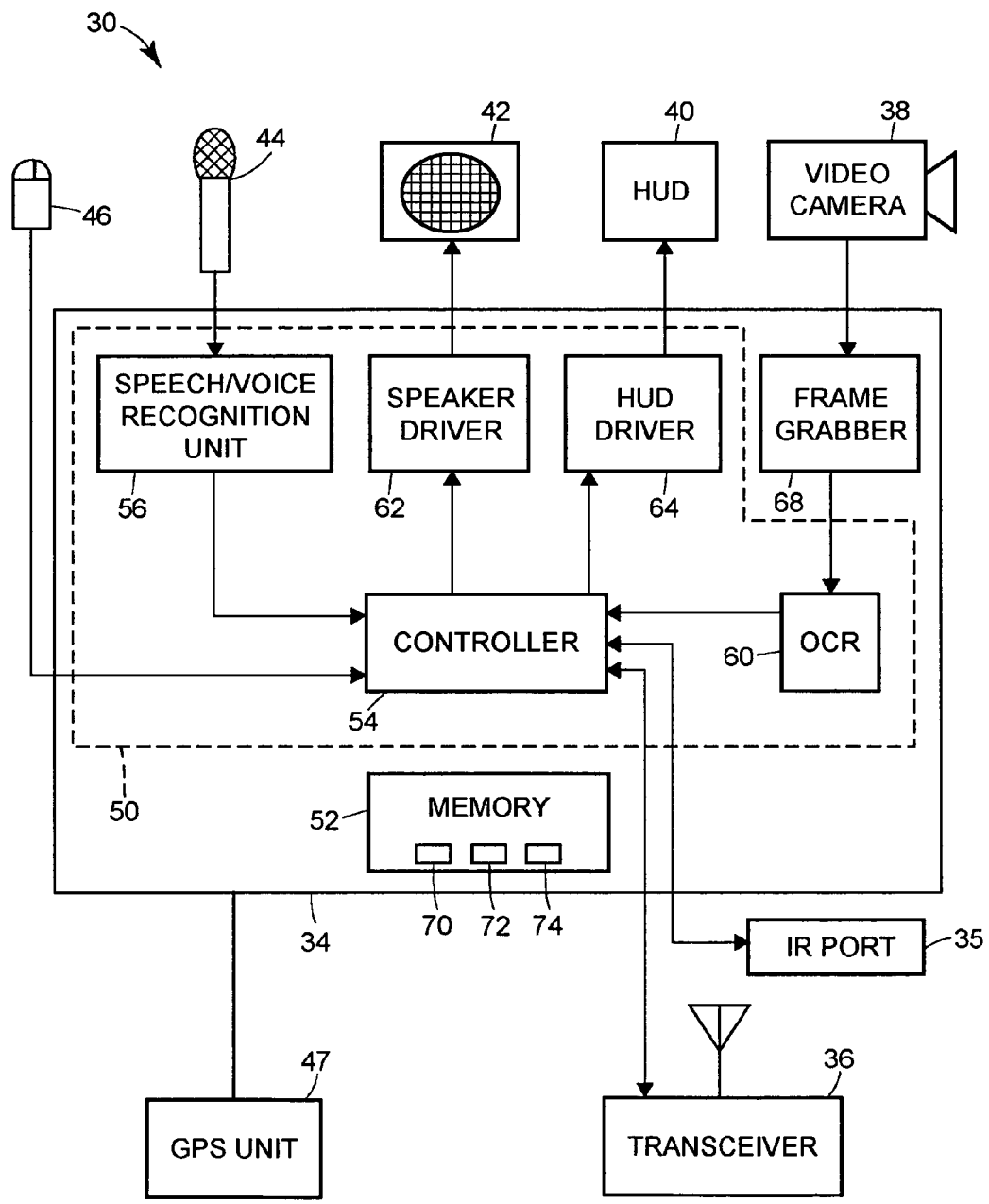
FIG. 2 is a schematic block diagram of the portable computer of FIG. 1.
Figure 4:
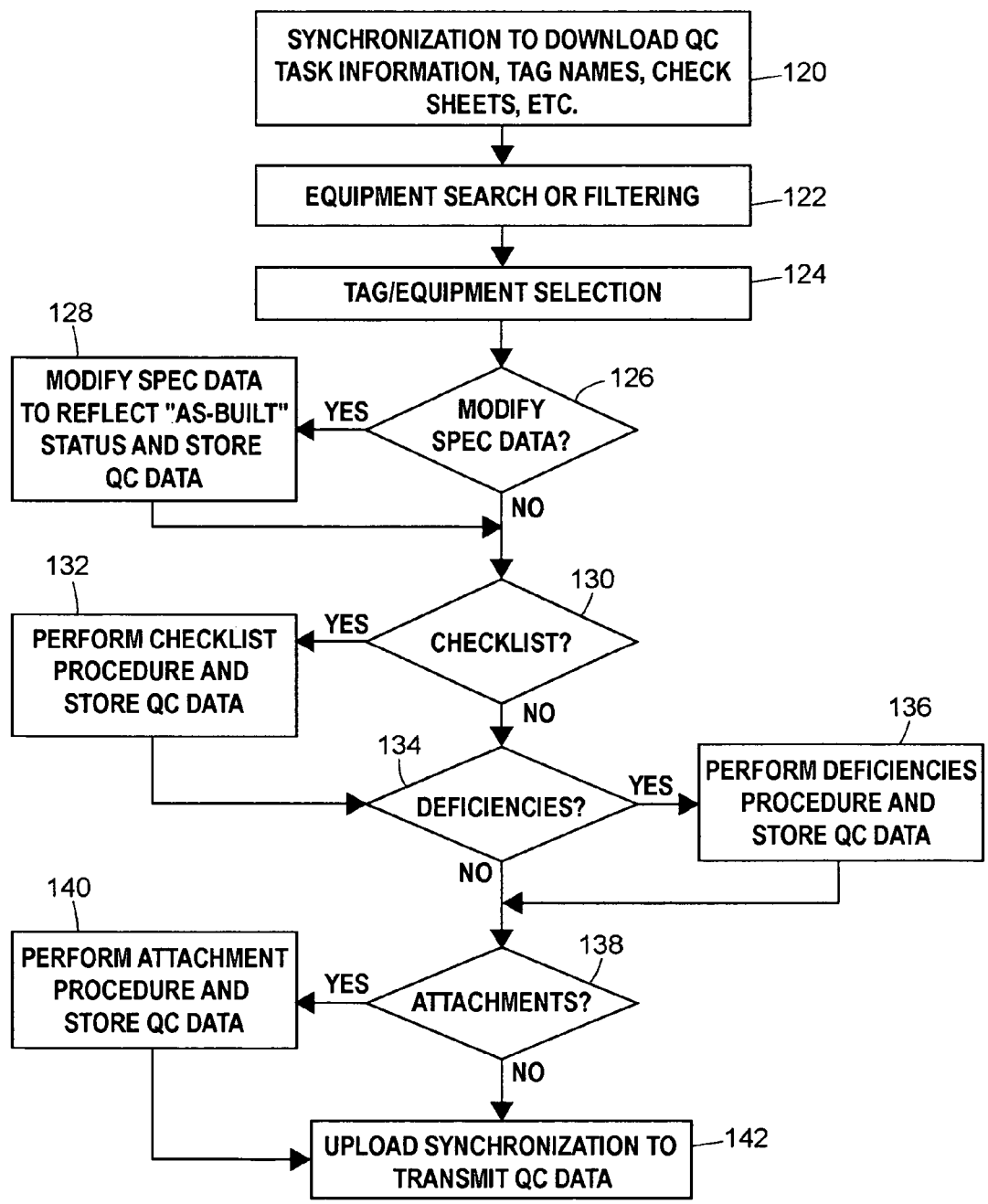
FIG. 4 is a flow chart diagram of data collection and transmission routines executed by the portable computer of FIGS. 1 and 2.
Figure 13C:
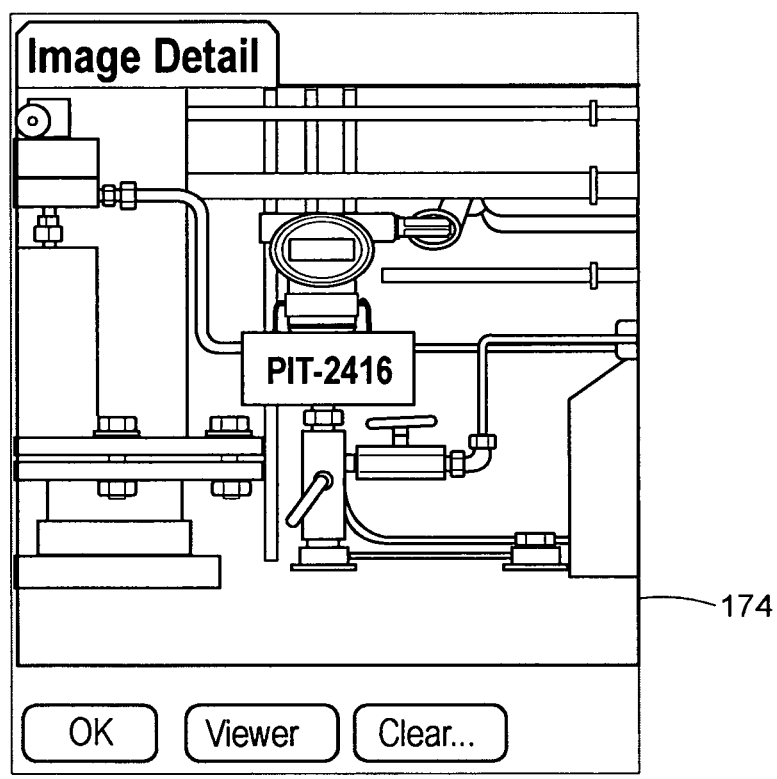

FIGS. 12a-12c are exemplary portable computer screen displays of deficiency display forms presented via a user interface of the portable computer of FIGS. 1 and 2 and used in connection with the data collection and transmission routines of FIG. 4; and, FIGS. 13a-13c are exemplary portable computer screen displays of attachment display forms presented via a user interface of the portable computer of FIGS. 1 and 2 and used in connection with the data collection and transmission routines of FIG. 4.

Figure 14A:
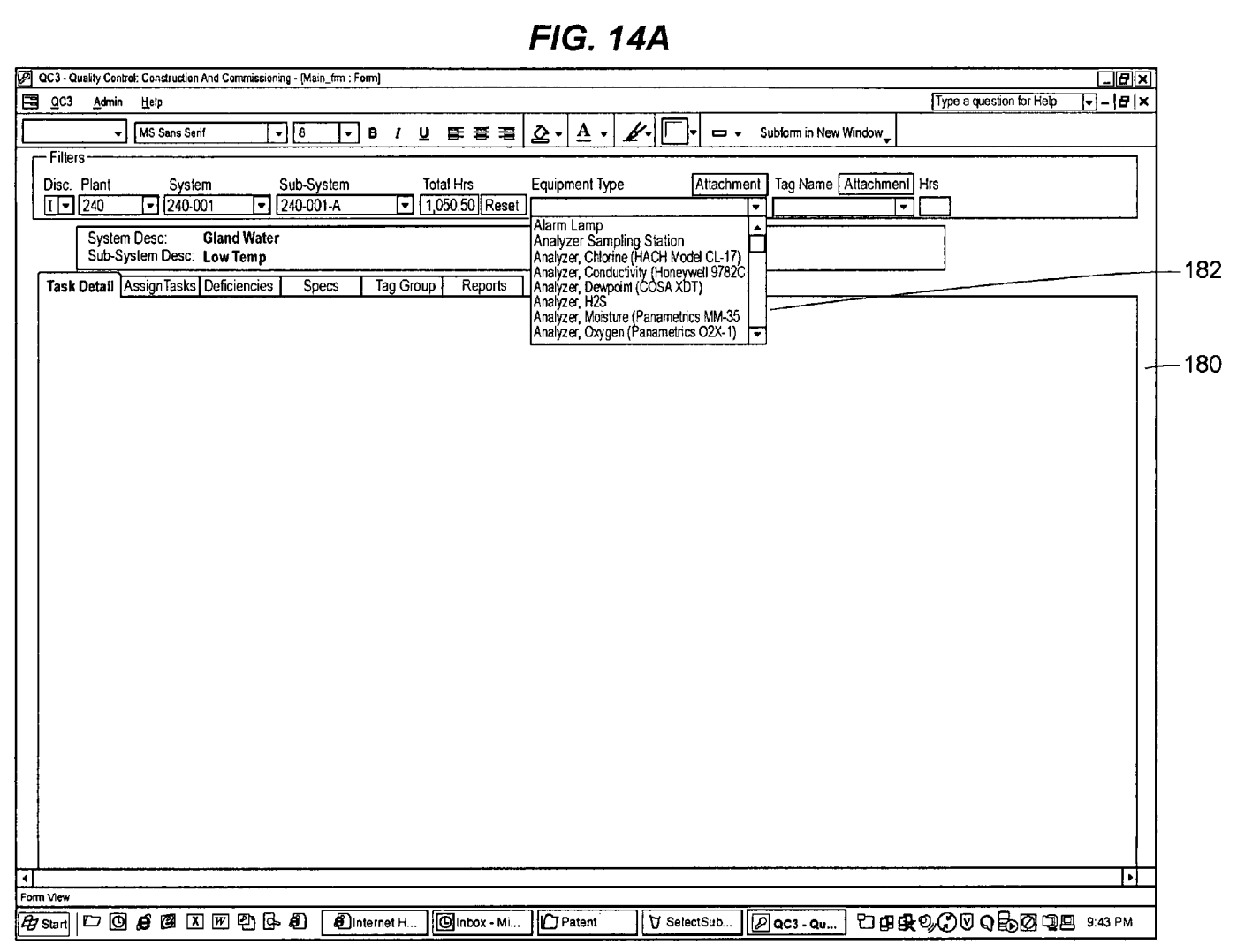
Figure 14B:
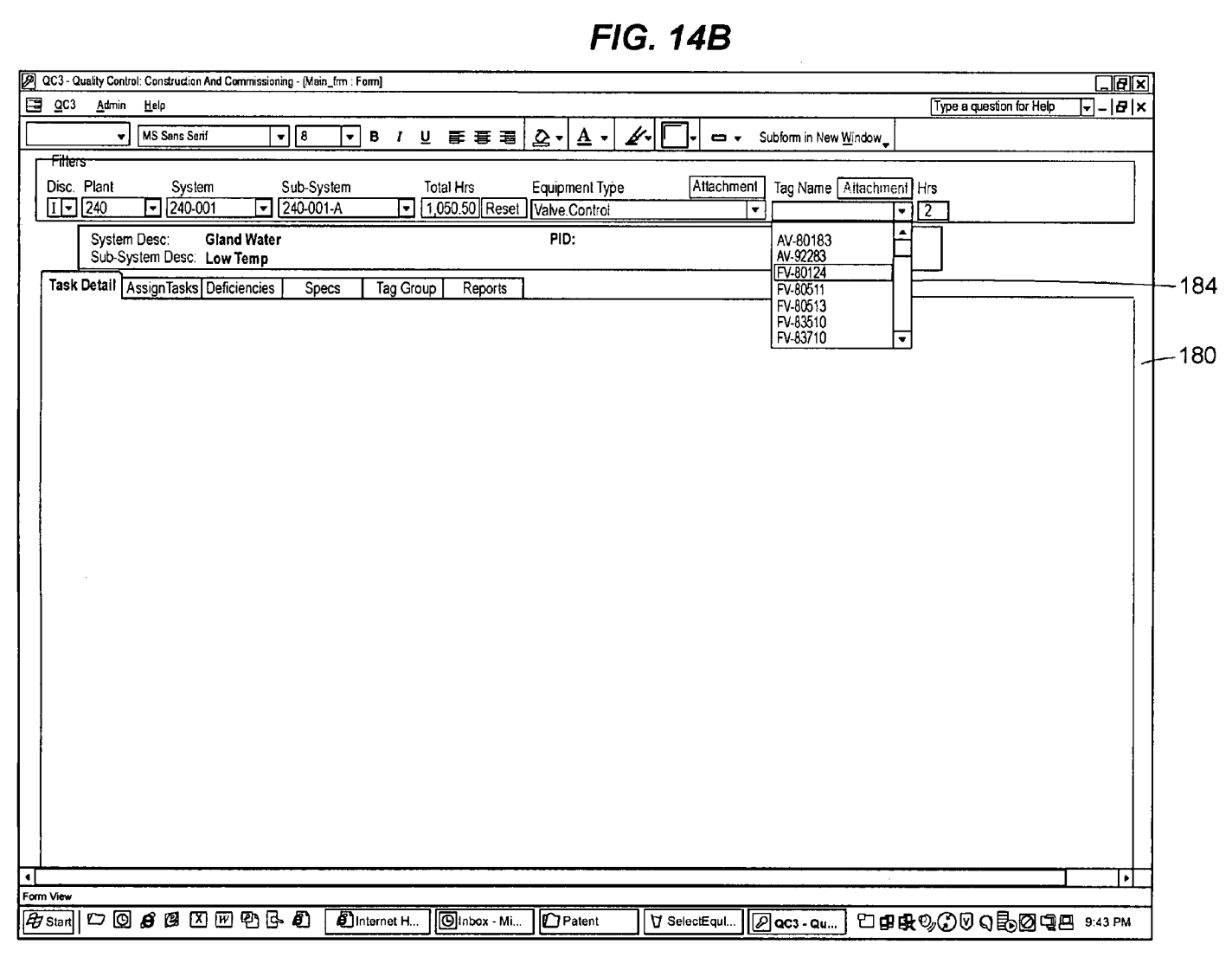

FIGS. 14a-b are exemplary computer screen displays provided via a user interface of the commissioning workstation of FIG. 1 and generated by database management software to facilitate selection of field equipment for display of project information associated therewith.

Figure 15A:
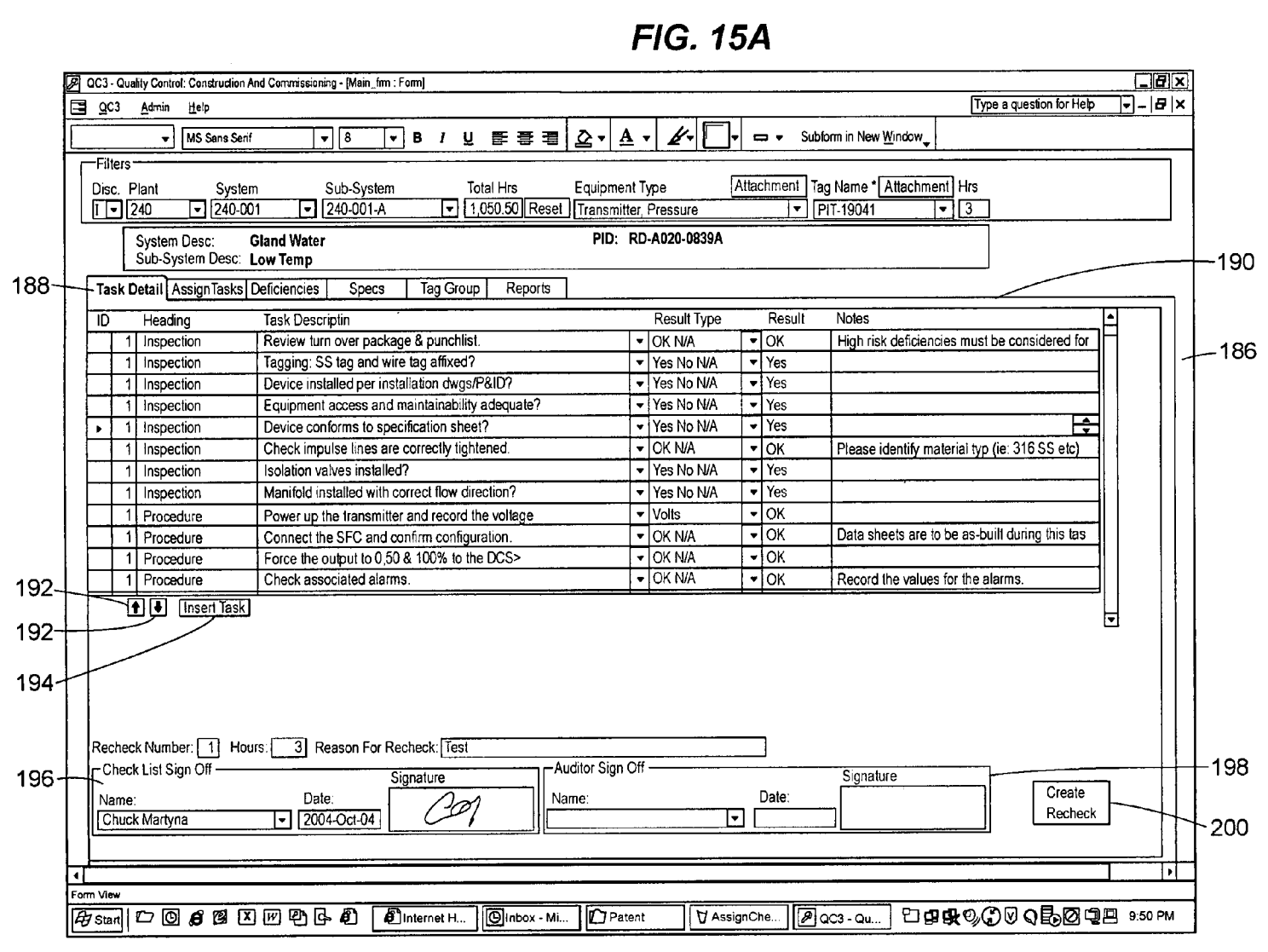
Figure 15B:
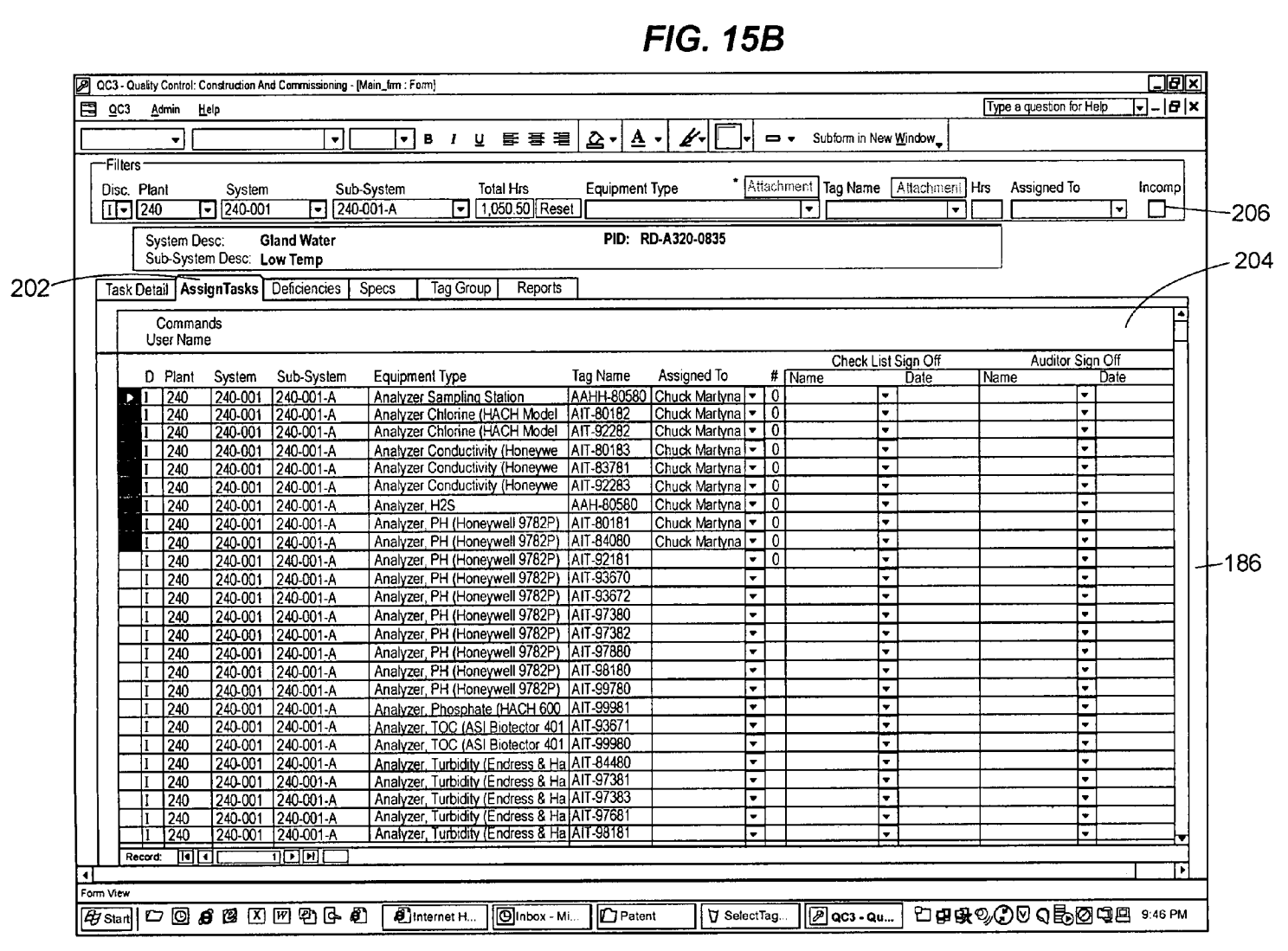
Figure 15C:
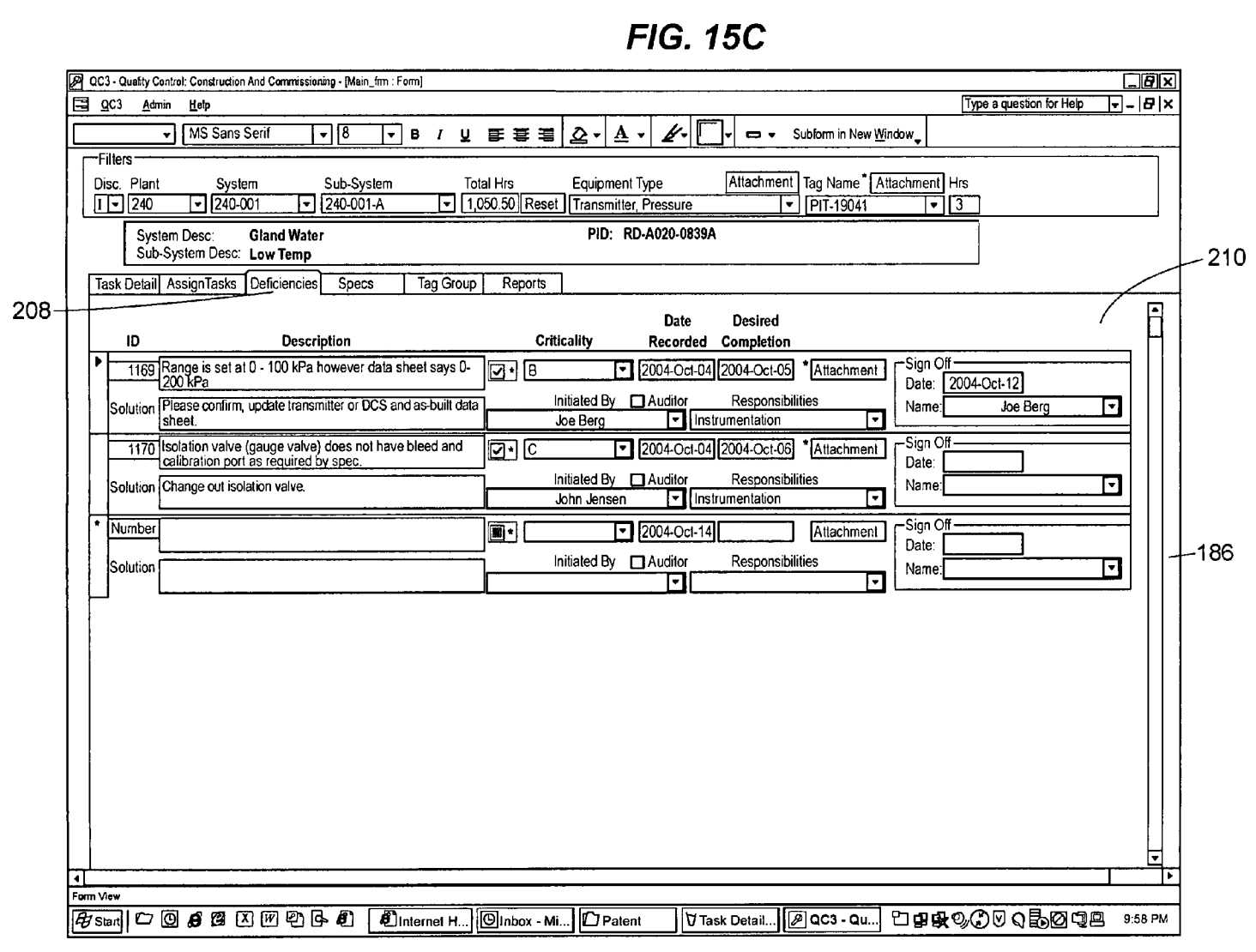
Figure 15D:
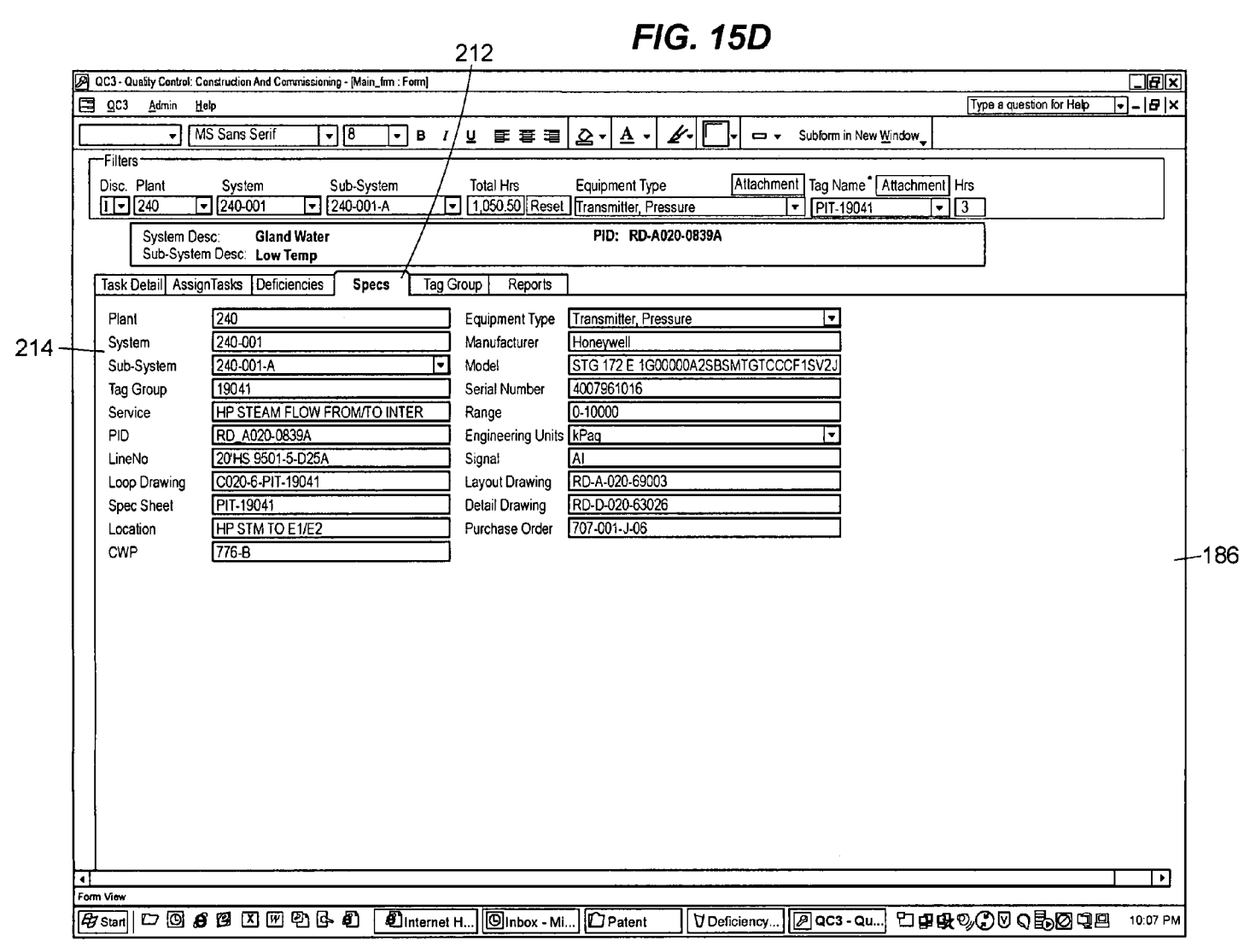
Figure 15E:
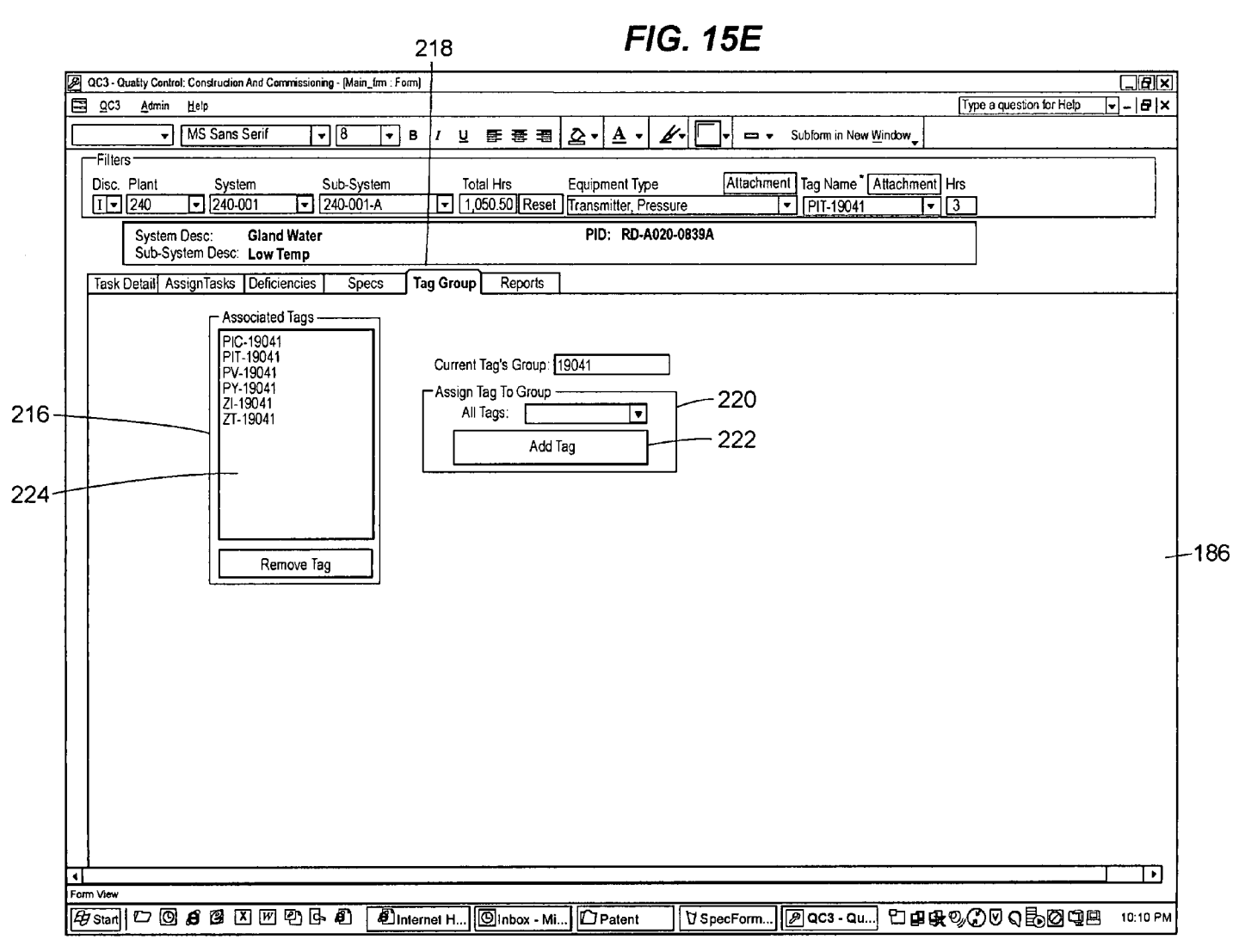
Figure 15F:
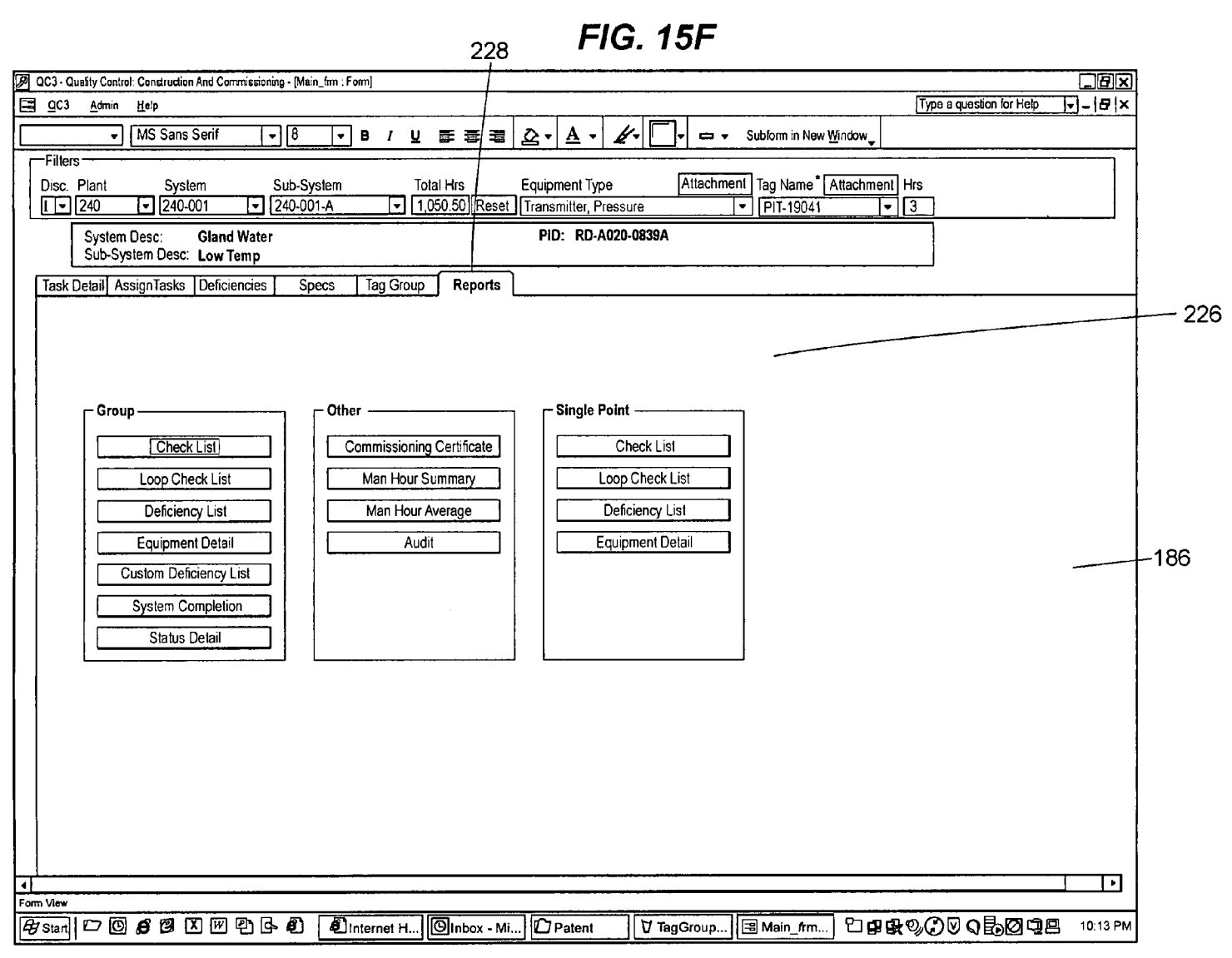

FIGS. 15a-15f are exemplary computer screen displays provided by the user interface of the host workstation of FIG. 1 and generated by database management software to display and process project information associated with field equipment selected by a user, including task information (FIG. 15a), task assignment information (FIG. 15b), deficiency information (FIG. 15c), tag specification information (FIG. 15d), tag group information (FIG. 15e), and other project information generated via one of a number of reports made available to a user (FIG. 15f).

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein

DETAILED DESCRIPTION OF THE EMBODIMENTS

Disclosed herein is a quality control technique and solution that eliminates the problems of traditional commissioning initiatives through implementation of standardized quality control processes and procedures in support of initiation of a process plant. These processes and procedures are implemented via a system that automates and integrates the quality control process, thereby improving the integrity of the documentation generated by the solution and the plant initiation process as a whole. In certain embodiments, the automated nature of the disclosed method and system utilizes a hardware and/or software toolkit based on a portable computing platform that supports quality control work performed throughout the plant, i.e., at field sites throughout the plant, and throughout the construction, commissioning and other phases of plant initiation. The portable computing platform generally enables (i) fast and easy access to equipment information in the field, (ii) check lists or sheets to define and standardize consistent quality control procedures on an equipment-specific basis, (iii) enforcement of quality control data integrity measures, (iv) equipment deficiency tracking, data capture, and management (v) project reporting, (vi) auditing capabilities, and (vii) remote data collection and synchronization. These advantages and functional capabilities arise from the aspects of the disclosed technique and solution described below, which avoid error-prone, inconsistent activities relied upon in the traditional approach to plant commissioning, such as manual data entry by personnel not directly performing the commissioning procedures.

Although reference is made herein to construction and commissioning procedures and processes, practice of the disclosed quality control technique and solution is not limited to any particular phase of the plant initiation process. In fact, the disclosed technique and solution may be applied throughout all construction, commissioning and other phases leading up to normal, live operation of the process plant. However, the disclosed technique and solution may also be applied to phases that involve partial or full operation of the process plant in which, for instance, the process plant undergoes an energized functional checkout, or any other stage or phase of the work leading up to, for instance, formal turnover and sign-off to operations personnel. The term "initiation" is used herein in connection with a process plant to include all of these phases of the project to which the disclosed technique and solution may be applied, and further includes and encompasses all procedures, efforts, activities and other work directed to or associated with construction, quality control, commissioning, pre-commissioning, startup, and other phases, stages or steps involved in readying or validating a plant for operation, or putting the plant into operation. That is, an initiation project may include any one or more of the project initiatives or phases during the period beginning with plant construction and ending with turnover to operations personnel. For instance, during the construction phase of an initiation project, the quality control technique and solution may involve, for example, inspection of installation work such as instrumentation mounting, electrical equipment code compliance, or rotating equipment operability. The initiation project may, but need not, begin with the construction phase, inasmuch as the initiation project may begin with, for instance, non-energized initiatives that may be considered pre-commissioning work. Other exemplary initiatives include such typical commissioning activities as performing loop checks (e.g., using electronic equipment to ensure wiring is correct and the a loop performs as designed), inspection (e.g., performing visual checks on field equipment and documenting conformity to installation standards), documentation (e.g., filing of all test results, including as-built drawings, check lists, specification sheets, etc., for each device into a loop folder), and startup (e.g., livening up process systems by introducing the products that will affect the flow, temperature, pressure and level measurements involved in the control systems). Other aspects typically associated with commissioning are, of course, also encompassed and, for instance, include deficiency management, as will be further addressed below.

Furthermore, practice of the disclosed quality control technique and solution is not limited to projects involving new plants or facilities, but rather may be applied in any number of quality control contexts, including, without limitation, retrofit or improvement projects involving existing facilities. The disclosed quality control technique and solution are also suitable for practice with the initiation of any type of plant or facility, and is not limited to practice within any one industry (e.g., upstream oil and gas, petroleum, pharmaceutical, etc.), or in connection with and particular product manufactured or produced.

Practice of the disclosed quality control technique and solution is also not limited to the manner in which the plant initiation work and responsibilities are handled, distributed, or contracted out to third parties. More particularly, the disclosed technique and solution are compatible for use in situations where an engineering contractor has complete responsibility over the plant from construction through turnover, or when the owner reassumes some control after mechanical, construction completion. In either case, the disclosed technique may be implemented as a business service (e.g., a quality control service in process plant construction and commissioning) to one or more entities involved in the construction, commissioning and other plant initiation process. When the service is provided to the owner of the facility or plant, the service provider may essentially act as a representative of the owner during the construction and commissioning process, documenting and tracking the process for the benefit of the owner. This service arrangement would address the conflicts of interest often inherent in having a contractor or other service provider monitor its own work, as well as provide a convenient way in which the client can obtain the benefits of the quality control solution without having to purchase all of the hardware, software, and/or other tools necessary for implementation. In this service arrangement, deliverables to the owner or other client or customer include a project history database having all of the quality control data collected and recorded throughout the project, including check lists, reports, as-built data, and other data as will be explained below. The toolkit, including at times both hardware and software, is then returned, insofar as the client is equipped with the data that can be used to establish both a documentation library as well as form the foundation for a preventative maintenance system, and no longer needs the toolkit. Alternatively, the disclosed technique and solution may be provided as a toolkit to be purchased, leased or licensed, but implemented in-house or by a third party. In these cases, the toolkit made available as a product to be implemented may involve any combination of hardware, software and other tools of the quality control system described herein. If, for example, the client already had in its possession suitable hardware and other devices for implementing the solution, then the product in that case may involve the delivery of software tools to be suitably installed. This arrangement, however, is only one of a number of ways that the disclosed quality control technique and solution may be practiced or implemented.

In accordance with one aspect, the disclosed technique and solution facilitate the generation and collection of quality control data at field sites located throughout a process plant. The use of one or more portable computers provides technicians, auditors and other personnel involved in the plant commissioning or other plant initiation process to record the quality control data in an automated fashion while at the field sites. In contrast to the distributed nature of the collection of the quality control data, a master database is maintained at one or more host workstations for accumulating, organizing, and integrating all of the quality control data collected at the field sites. More generally, the database stores historical information for the project as a whole, including the information necessary to define and control the commissioning process, as well as the quality control data generated thereby. As an example, the project history information in the database may, at any one point in time, include data indicative of calibration records, names of personnel completing check lists, personnel signatures, date of sign-off, and inspection results. All such information may be recorded in the field using the portable computers and synchronized to the data base to form the project history.

The disclosed technique and solution is also useful for identification, tracking and other management of deficiencies uncovered during the initiation project. The portable computer may generally be used to identify the deficiency by, for instance, recording digital pictures. The database may then store such deficiency information, including a criticality level assigned to each respective deficiency that may be specified using the portable computer. Further examples of deficiency information captured by the portable computer and/or stored in the project database are responsible or assigned repair personnel and desired completion date. Sign-off of these deficiencies may also be done using the portable computer.

Generally speaking, the disclosed technique and solution supports a controlled and/or limited access approach to the database, the project history information stored therein, and other aspects or components of the disclosed method and system. For instance, the system may be configured such that not all project personnel have read/write capability. The configuration may also specify that certain personnel are allowed to report on the deficiencies only for a specific plant, system or sub-system.

Referring now to FIG. 1, the disclosed quality control technique and solution will be described in connection with an exemplary process control system 10 associated with a plant or other facility under construction or otherwise in the midst of a commissioning process. The system 10 includes a process controller 12 connected to a host workstation or computer 14 (which may be any type of personal computer or workstation) and to field devices 15, 16, 17, 18 and 19 via input/output (I/O) cards 20 and 22. The controller 12, which can be by way of example, the DeltaV™ controller sold by Fisher-Rosemount Systems, Inc., may be communicatively connected to the host computer 14 via, for example, an ethernet connection and may be communicatively connected to the field devices 15-19 using hardware and software associated with any desired communication protocol, such as, for example, the FOUNDATION™ Fieldbus, the HART®, PROFIBUS®, WORLDFIP®, Device-Net® or CAN protocols. In operation, the controller 12 implements a process control routine stored therein and communicates with the devices 15-22 and the host computer 14 to control a process in any desired manner. The field devices 15-19 may be any types of devices or equipment, such as instrumentation, electrical, or mechanical equipment, and more particularly, sensors, valves, transmitters, positioners, etc., while the I/O cards 20 and 22 may be any types of I/O devices conforming to any desired communication or controller protocol.

As is typical, commissioning each of the field devices 15-19, I/O cards 20 and 22, and other nodes of the system 10 involves an evaluation by a technician or other personnel at their respective field sites within the plant. As illustrated in FIG. 1, to automate and standardize the evaluation in accordance with the disclosed quality control technique and solution, the host computer 14 may be communicatively coupled to a portable computer system or device 30 through a remote or wireless communication device, such as a remote ethernet transceiver 32. Alternatively or additionally, the host computer 14 may be coupled to the portable computer system 30 via a physical line or bus having terminals located throughout the process control environment to which the portable computer system 30 can be temporarily connected and disconnected.

The embodiment involving the host computer 14 assumes, of course, that the host computer 14 is operational at this stage of the plant initiation project, and that the host computer 14 constitutes the desired location of the project history database in which the quality control data will be integrated and stored. However, this is often not the case. For instance, the host computer 14 may not yet be available, insofar as the quality control work is beginning at the earliest stages of plant construction. For that reason, or any one of a number of other reasons, a further host workstation or computer 33 may also be communicatively coupled to the portable computer system 30 through a similar wireless or physical arrangement. The host workstation 33 is often remotely located from the process control system and network, and may or may not be connected to that network. Notwithstanding the foregoing, the database implemented in accordance with the disclosed quality control technique and solution may be located in a memory of either host workstation, or be distributed to, or duplicated in, both workstations, and any other host workstations, as desired. In fact, it should be understood that the host workstation 33 may be implemented in a client-server arrangement, in which case the host workstation 33 includes a server (not shown) that provides centralized memory, processing, and other computing functions for a number of networked computers that provide similar and other functions, such as user interface functionality, via password protected access. Such password-regulated access also provides a way in which different users may be given differing access levels, as will be explained further below. In any event, the communication between the portable computer 30 and the host workstation(s) in which the project history database is stored may be implemented in accordance with any technology, protocol, system or technique, and need not involve a direct wireless, hard-wired, or other connection between the two computers. The communication may, for instance, include or involve an indirect wireless or other Internet connection to enable remote locations of either the host workstation or the portable computers in the field.

The portable computer system 30 will now be described in greater detail, and may incorporate any of the functions and capabilities of the portable computer system described in U.S. application Ser. No. 09/951,715, entitled "Portable Computer in a Process Control Environment," filed on Sep. 13, 2001, and published on Sep. 19, 2002 as Pub. No. US 2002/0130846, the disclosure of which is hereby incorporated by reference. Although the following description (as well as the description incorporated by reference) may involve aspects, elements, or capabilities of the portable computer used in connection with an operating process, the same aspects, elements, and capabilities may be applied in accordance with the description and teachings of the present application for practice of the quality control technique and solution disclosed herein, and in connection with a commissioning process.

The portable computer system 30 may include a wearable, hand-held, tablet, or other portable computer 34 having a number of communication ports, terminals, etc. For instance, the portable computer 34 may have an infrared port 35 for transmitting, or "beaming" check lists, or other quality control data between similarly equipped portable computers. The portable computer 34 may also have a remote transceiver 36 for establishing wireless communication. The transceiver 36 may support any one or more communication protocols (e.g., IEEE 802.11b or 802.11g, cellular or other mobile phone transmissions, Bluetooth, etc.), for either short, long or any other transmission to either other portable or host computers involved in the initiation project.

More generally, and as used herein, the term "portable computer" is not limited to any one type of portable computer, and may refer to or include, for instance, any computer compatible with operation under circumstances involving mobile use and/or transport between field sites in the process plant, and may refer to either the portable computer system 30 or the portable computer 34 of FIG. 2. In one embodiment, the computer 34 is based on a personal digital assistant (PDA)

platform and, accordingly, may include a PDA commercially available from a number of sources. In one exemplary case, a Palm Zire 72 is used. In another embodiment, the computer 34 includes a Pentium class CPU mother board with video, sound, RAM (e.g., 64 Mb) and ROM with a hard drive (e.g., 4.3 Gb), all of which may be located within a wearable computer harness (not shown).

The portable computer 34 also includes a number of peripheral devices, components, or functions, as separate items coupled thereto or integrated therewith, that collectively form a user interface of the portable computer. Some or all of the peripheral devices or components may be integrated within a housing of the computer 34. The computer 34 may include any number of communication ports or slots, such as PCMCIA slots, one of which can be used to receive the remote transceiver 36 and another of which may be used to receive a video processing board such as a video frame capture board. The peripherals communicatively coupled to the computer 34 may include an imaging device 38, which may be a video or digital camera, a heads-up display or any other display or screen (hereinafter "HUD" for convenience) 40, a speaker 42, which may be a headphone speaker or any other type of speaker, a microphone 44 and a user input device 46 that may be for example, a typical keyboard, a mouse, a track ball or other scrolling device (e.g., scroll wheel), and any other input/output interface presenting the capability of entering data or controlling the portable computer. The portable computer system 30 may also include a global positioning system unit 47 which, as described further below, may enable the portable computer system 30 to inform the user and/or the host workstation 14 of the user's current location within the process plant. Of course, any other peripheral devices may be used instead of or in addition to those specifically described herein.

In one embodiment, the user interface is centered around the display 40, which includes sensors establishing a touch-screen interface and handwriting recognition software. PDAs and other portable computers having such touch-screens are well known to those skilled in the art, as are the stylus or other tools used to control the interface.

The imaging device 38 may be a digital camera integrated within the housing of the computer 34 or mounted on the HUD 40 or on some other device (such as wearable headgear) that causes the field of view of the camera 38 to point in the direction that the user is looking. One video camera that may be used for this purpose is sold by the Pulnix corporation. The Pulnix video camera conforms to the high definition television (HDTV) standard (i.e., produces an 800 by 600 color pixel image frame), has about one-quarter of an inch to one-half of an inch diameter lens and produces a high resolution color image. However, other video cameras can be used instead including, for example, video cameras that produce high or low definition color or black and white (i.e., gray-scale) images. In some instances, a low definition video camera (either color or black and white) may be preferable to speed up the time needed to process an image in the manner described below.

The HUD 40 may use an NTSC video format and may be a monocular HUD such as the M1 HUD sold by Liquide Image Corp. located in Canada. This HUD provides a quarter VGA (i.e., 320 by 240 pixel) gray-scale image. Of course, HDTV format HUDs (which are currently prohibitively expensive) or other color or gray-scale HUDs, either those available now or those developed in the future, could be used instead. The speaker 42, the microphone 44 and the input device 46 can be any suitable and easily transportable devices and may be mounted with respect to the wearer or user or are integrated within the computer 34 to facilitate hands-free activities. In one embodiment, a bone microphone may operate as both the microphone 44 and the speaker 42. As is known, bone microphones use the bones within a wearer's jaw to detect voice signals and/or to produce sound signals at the wearer's ear.

The portable computer 10 need not communicate solely via the transceiver 36. The portable computer 10 may couple into the process control network for communication with one of the host workstations 14, 33. In cases where the network is not available, or when the transceiver 36 is inoperable, the portable computer 10 may use another discrete device, such as a mobile phone, to act as a surrogate transceiver, and establish a connection with the host workstations 14, 33 via the Internet. In either case, the host workstation 33 may have a transceiver 48 similar to, or differing from, the transceiver 32 to establish a wireless communication link with the portable computer 10. The wireless communication link may involve a connection to the Internet to enable communication over large distances. In alternative embodiments, the communication link includes a short-distance wireless link, such as a Bluetooth link, or a physical connection between the host workstation 33 and the portable computer 10. The physical connection may take any form, and involve any communication protocol. In cases where the portable computer 10 is a PDA, the connection may include a docking station and a Universal Serial Bus (USB) connection via a short cable coupling the portable computer 10 and the host workstation 33.

Referring now to FIG. 2, the portable computer 34 includes a CPU or other processor 50 coupled to a memory 52, which may be any type of memory or combination of internal or external memories including, for example, a disk drive (such as a hard, magnetic or optical disk storage device), RAM, ROM, flash, EEPROM, EPROM, etc. The CPU 50, which can include one or any multiple number of processor units (or other hardwired or firmware elements) that operate independently or in a coordinated manner, executes one or more software applications (stored in the memory 52) using any of the inputs to the computer 34, information stored in the memory 52 and/or information provided from the host system via the transceiver 36. The CPU 50 also provides outputs to the peripheral devices, as well as to the host system via the remote communication device, i.e., the transceiver 36. In the embodiment of FIG. 2, the CPU 50 is illustrated as including a controller 54 that may be implemented in hardware or software and that executes the operating system associated with the computer 34 to recognize different inputs from the peripheral devices and other components of the computer 34. Additionally, the controller 54 may execute one or more applications as described in greater detail below. The CPU 50 illustrated in FIG. 2 may include or execute a speech/voice recognition unit or application 56, an optical character recognition (OCR) unit or application 60, a speaker driver 62 and a HUD driver 64. Furthermore, the CPU 50 may be coupled to a video frame grabber 68, which may be provided on a separate video processing board.

The speech/voice recognition unit 56, which may be, for example, the Dragon Dictate system sold by Dragon Systems of Boston, Mass., or any other desired speech/voice recognition unit, is typically implemented in software as an application, but may alternatively be executed on a separate processor board. In any event, the speech/voice recognition unit 56 receives speech, voice or other sound signals from the microphone 44, performs speech and/or voice recognition processing thereon and delivers commands to the controller 54 based on recognized voice inputs. The speech/voice recognition unit 56 may perform any desired or known processing on the received voice signals to identify certain recognized speech commands or words. During this process, the speech/voice recognition unit 56 may compare an identified voice command to a list of stored or recognized commands (stored in, for example, the memory 52) to determine if a valid command is being delivered by the user. If a recognized and authorized command has been received, the speech/voice recognition unit 56 may deliver the command to the controller 54 for further processing. Of course, if desired, the controller 54 may determine if a voice command is a valid or recognized command within the context of the application being run on the controller 54 and may notify the user when an unrecognized and/or unauthorized command is received. The speech/voice recognition unit 56 may also have learning capabilities and may be adapted to recognize a particular voice, a group of voices, or speech generally, as is known.

The microphone 44 may be used to record other audio signals not associated with speech or voice recognition. For instance, the user of the computer 30 may simply record a comment in the memory 52 in association with a task, deficiency or other activity being implemented as part of the initiation project. More generally, any audio recording (i.e., audio clip) may be made and recorded as quality control data and, may be particularly useful for further clarification of a problem, deficiency, etc.

In a software-based embodiment, the memory 52 of the portable computer 34 stores one or more routines directed to implementing the disclosed quality control technique and solution. Of course, the routines may alternatively be recorded in hardware or firmware, and the routines may be organized or stored in aggregate or distributed fashion. In one embodiment, the memory 52 has a quality control routine 70, a data collection routine 72, and a data transmission or synchronization routine 74. The routines 72 and 74 may be subsumed within, or subroutine portions of, the quality control routine 70, but are shown as separate blocks for ease in illustration. The quality control routine 70 may also include functionality that generally facilitates the implementation of the data collection routine 72 and the data transmission routine 74, as will be described in greater detail below.

As shown in FIG. 1, each host computer 14 and 33 may also have a memory in which a data synchronization routine 76 is stored. One or both host computers 14 and 33 may also have a project history database 78 stored in the memory thereof. As is well known to those skilled in the art, the database 78 may be implemented using database management software integrated therewith, such as Microsoft Access or MS SQL Server, the engines for which would also be stored or resident on the workstation having a copy, portion or other aspect of the database. The database 78 may be a relational database, and may include and use any one of a number of commercially available data management software systems. Generally speaking, such software systems provide data analysis, data mining, and other tools for analyzing the project history information stored in the database, as well as tools for adding software functionality to the database system, such as report generation. For instance, and as will be explained hereinbelow, the database management software and other tools are implemented to generate a user interface for the host workstation having the project history database 78. The user interface facilitates analysis of the data through on-screen or printed reports presenting various aspects of the project history. The project history information may include information such as calibration test results, compliance with specification sheets, and as-built data, as will be explained further below.

Figure 3:
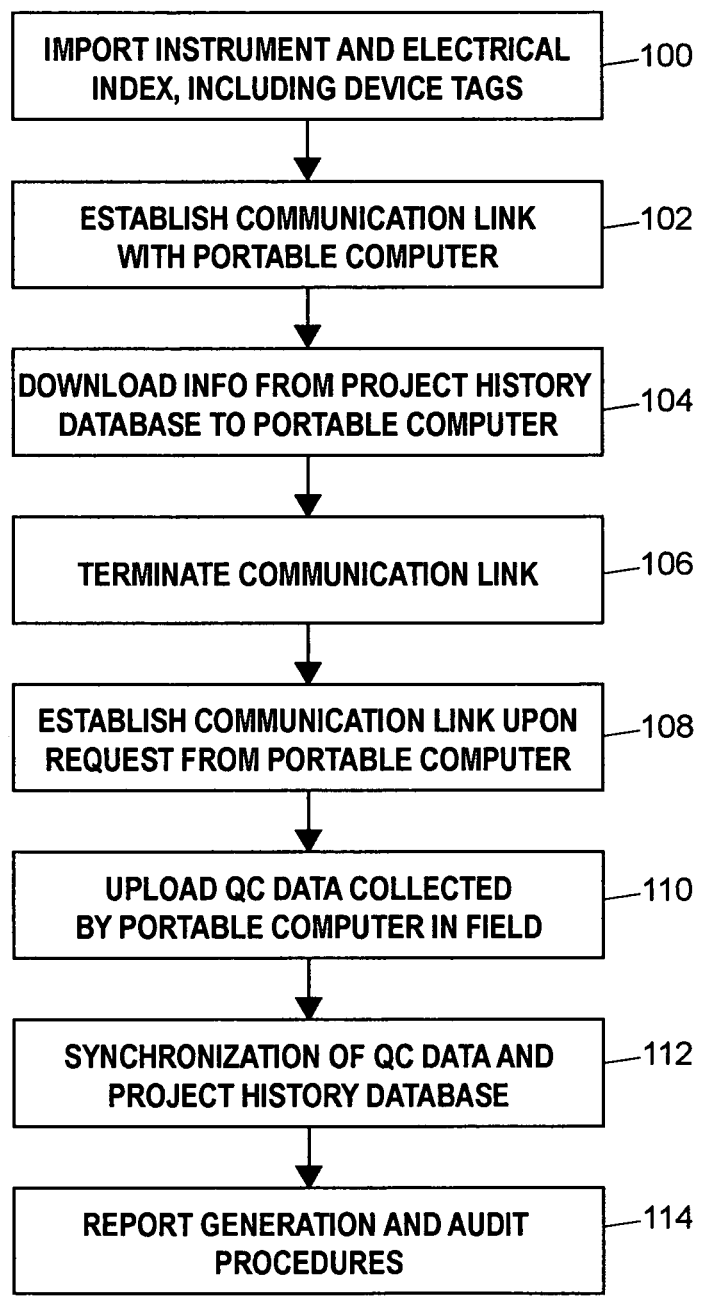
FIG. 3 is a flow chart diagram of a routine executed by a workstation, such as the host workstation of FIG. 1, that facilitates portable quality control data collection in accordance with one embodiment.

FIG. 3 illustrates a block diagram of a software routine executed by one of the host workstations in order to support and establish the use of portable computers 34 in the field and facilitate the management of the database 78. Initially, and in connection with creating and establishing the project history database 78, the host workstation imports in a block 100 the instrument and electrical index, which includes design specification data associated with device tags for the process plant. As is often the case, the information provided in the index is both incomplete and inaccurate. The commissioning process and, more generally, the plant initiation project implemented in accordance with the portable computing technique and solution provides a quick and easy way to view, correct, or supplement the information provided in the index, as will be described herein below.

Once the database is initialized, any number of portable computers (such as the computers 30, 34 described above) may be issued to technicians, auditors, engineers and any other personnel involved in the commissioning process. In a block 102, a communication link is established with each such portable computer to enable the transmission of information contained in the database 78. Typically, only a portion of the database is downloaded to a particular portable computer in a block 104, because, for instance, a technician may only be assigned to a particular plant, subsystem, etc. However, more than one technician may be assigned to the same plant, sub-system, etc., in which case rules governing and establishing data priority may be necessary, as will be described below. The communication link, as described above, may take any form, including wireless, serial cable, etc. Once the downloading is complete, the communication link is also often terminated in a block 106, but this need not be the case, particularly when wireless communication schemes are involved. At this point, the portable computer 34 is used by the quality control personnel in the manner described hereinbelow, which typically involves use of the portable computer at the field sites at which the equipment is disposed.

At any point thereafter, and presumably after quality control data has been generated and recorded using the portable computer 34, one of the portable computers 34 issued to the commissioning personnel may request that a communication link be established (or re-established) with the host workstation 33. Thus, in a block 108, a further communication link is established between the computers, which again may take any form. The request from the portable computer 34 may also be automated such that connecting the computers via, for instance, a serial cable initiates the communication link request and connection. Next, a block 110 uploads the quality control data collected in the field by the portable computer 34 and a block 112 synchronizes the uploaded data with the information stored in the database 78.

At any point in the above process, an operator of the workstation 33 may be monitoring the initiation project and view the quality control data recorded thus far. In the event that frequent or continuous synchronizations are occurring, such monitoring of the initiation project presents a real-time, accurate representation of the status. To capture a snapshot or other instantaneous representation of the initiation project, the workstation operator may request that a report be generated in a block 114. Alternatively or in addition, the operator may commence an audit procedure that evaluates the status and other aspects of the project. Exemplary reports and audit procedures will be described in greater detail hereinbelow.

With reference now to FIG. 4, a quality control routine executed by the portable computer 34 is shown. Generally speaking, the quality control routine includes a data collection routine and a data transmission routine. Data collection generally involves steps taken out in the field, while data transmission generally involves steps taken while interfacing and communicating with the host workstation. The data collection routines are generally supported using display forms, or forms displayed via the user interface of the portable computer 34. Such forms may be created using commercially available software. For instance, if the portable computer 34 is a PDA running the Palm OS operating system, then the forms software available from Pen Dragon may be used. Further information and examples of the form displays is set forth herein below and shown in the figures. Similarly, the data transmission routine may also be based on commercially available software that facilitates synchronization of data stored in the portable computer 34 with data stored in another computer, such as the workstation 33. In the Palm OS context, HotSync synchronization software may be utilized to this end. Any one of a number of other synchronization programs may also be used to facilitate the data transmission as well as the data integration with the information stored in the database 78.

Initially, information from the database 78 must be downloaded in a block 120. Such information includes equipment tags, equipment specification data, and the plant, system, subsystem and other contextual information that identifies the location of the equipment. Such information also includes the respective commissioning tasks that must be performed in connection with the equipment. Such tasks are organized in check lists or check sheets, exemplary versions of which will be described below and shown in the figures. Any other information associated with the equipment may also be downloaded, including information indicative of commissioning or other work already performed in connection with the equipment. This aspect is particularly relevant to the situation where an audit is occurring, such that the portable computer has been issued by an auditor reviewing the prior work of a technician.

After the portable computer has been equipped with the project information, in a block 122, the technician, auditor or other commissioning personnel may search or filter the information for a field device, equipment instrumentation, etc. Any one of a number of criteria may be used to perform the search or filtering operation, including plant, system, subsystem, equipment type, and tag name (see also the exemplary form display depicted in FIG. 6). Based on the search or filtering operation, a tag specifying and indicative of certain field equipment is selected by the user in a block 124, and the data collection process may begin for the selected equipment. Alternatively, a tag may be directly entered by the user.

The equipment specification data, if not the tag itself, provided initially may be incorrect. As a result, certain users (e.g., a technician, but not auditors) are provided an option in a block 126 to modify the specification data to reflect the condition of the equipment "as-built" (see also the exemplary form display depicted in FIG. 7). If this option is taken, the user may select a portion of the specification data form and enter in modifications in a block 128. In connection with the entry of the "as-built" information, and any other information entered into a form via the user interface of the portable computer 34, it should be understood that the portable computer 34 automatically stores data indicative of such information in the memory 52 thereof. Unless later modified, such data becomes the quality control data uploaded to the database 78 for integration with the project history information stored therein.

The main form (see, for instance, FIGS. 7 and 8) displayed to the user for the selected equipment also provides an option of selecting a check list for the equipment in a block 130. Selection of this option provides the user an opportunity to view the commissioning and other initiation project tasks that should be (or already have been) completed in connection with the selected equipment. In the case of a technician, the tasks may be completed, and information indicative of such completion may be entered and stored in a block 132.

Specification of these commissioning tasks provides a consistent, standardized approach to validating the design documentation and the commissioning process generally. It also provides a structure that establishes and enforces data integrity for the quality control data collected during the commissioning process and, more generally, the initiation project.

The check lists, and the tasks specified therein, are customized for the equipment and equipment type involved. In one embodiment, the tasks and check lists and other information specific to equipment type are already stored in the project history database prior to the importation of the equipment index.

Similarly, the main form also provides an option in a block 134 to view any deficiencies that have previously been recorded in connection with the selected equipment. Selection of this option generally provides the user to record and store in a block 136 new information (i.e., quality control data) associated with a deficiency, including previously noted or newly identified deficiencies. Such deficiency information may be entered or recorded ay any time, and may include an indication that the deficiency has been resolved or otherwise addressed.

Figure 6:
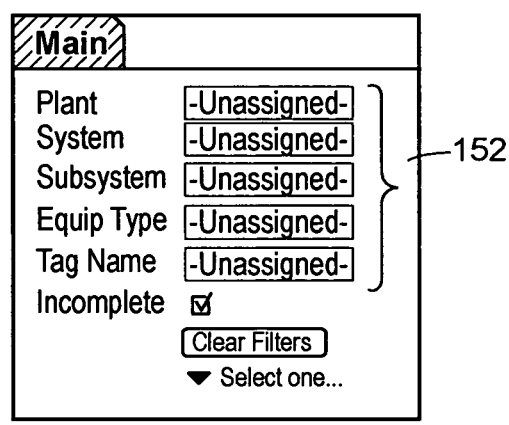
FIG. 6 is an exemplary portable computer screen display of a filter or search menu display form presented via a user interface of the portable computer of FIGS. 1 and 2 and used in connection with the data collection and transmission routines of FIG. 4.

As shown in the exemplary form depicted in FIG. 6, with an "incomplete" option selected, the selection of the deficiencies option provides a list of all equipment having deficiencies still requiring repair or resolution. The technician may also access a subset of the equipment having deficiencies, whether complete or incomplete, by filtering the list provided with other criteria (e.g., by specifying the system or equipment type).

The technician may also sign off on a deficiency using the form provided in connection with each respective deficiency selected and, in particular, by selecting a "Fixed By" option. More generally, selecting a deficiency provides a display of the details of the deficiency (see, e.g., FIGS. 12a-12c), from which the technician may select "NEXT" to continue, as necessary, and review or modify information such as criticality level, date, the user initiating the deficiency, etc. If a photograph was taken in connection with the deficiency, then an option to view the photograph is also displayed in the form. The display of an asterisk or similar notation indicates that a photograph exists. Similarly, a voice or other audio clip may be recorded in connection with each deficiency.

More generally, and in connection with any one of the options (e.g., checklists, deficiency, etc.) available, as well as a stand-alone option, a user is provided in a block 138 with an option to attach (i.e., associate) any one of a number of documents, images, audio clips, or other data sets to the quality control data recorded in connection with the selected equipment. If selected, an attachment form is provided in a block 140 that facilitates the attachment procedure, and the entry of any supplemental information indicative of, or related to, the attachment. One example of an attachment is an image taken by a digital camera of the portable computer. Other attachment types include photographs by device type, commissioning procedures by system, HAZOP documents, any text or spreadsheet documents (e.g., Word or Excel), and voice memoranda.

At any time during the routine shown in FIG. 4, the user may temporarily exit the routine and initiate in a block 142 a data transmission or synchronization with the host computer 33. Alternatively or in addition, the data transmission may involve or include a synchronization with another portable computer 34. Such transmission may again take any form (e.g., Bluetooth, IR, serial cable, etc.).

The data transmission and database synchronization procedures may follow certain data priority and other rules, which may be established, customized or otherwise modified by a user at the workstation. For instance, the rules may specific the unique circumstances under which data recorded in connection with partially completed check lists may (or may not) be imported into the database 78. Other examples include whether as-built data recorded in the portable computer 34 can overwrite the information stored in the database 78, whether the data recorded in a subsequent portable computer 34 can overwrite the information previously imported from a prior portable computer, whether deficiencies are exported to the portable computer, and whether tags are exported to the portable computer. Generally speaking, these rules may define and establish the conditions under which data importing and exporting may be permitted or not permitted.

In an exemplary embodiment, check Lists can be assigned to one or more persons. If an administrator or other operator of the host workstation 33 decides to assign the same check list to more than one technician, then this will be a deliberate act requiring action. As an example, assume that the check list for certain field equipment, e.g., tag for flow transmitter FT-100, is assigned to two technicians. Under one scenario, the first technician completes tasks nos. 1-3 of ten total tasks, and then performs a synchronization. The result is that the host workstation 34 will accept the task results during synchronization and show the updated results for tasks nos. 1-3. If the second technician subsequently completes all tasks 1-10 and then signs off the check list, then a subsequent synchronization initiated by the second technician will result in the acceptance of the new quality control data, including overwriting the earlier results associated with tasks nos. 1-3. This rule may reflect a decision by the administrator to configure the database 78 to provide priority to the last technician to inspect the field device and/or provide a review of the work of the first technician. Now that data is stored in connection with all ten tasks and a technician has signed-off for the FT-100 device, the database 78 will reflect that the FT-100 device is completed, and any progress reports will be updated automatically.

In a second scenario, assume that the first technician completes all ten tasks, signs off the check list, and initiates a synchronization. The result in this exemplary case is that the database 78 will accept all task results during synchronization and show update the FT-100 as complete. If the second technician subsequently completes tasks 1-3 and then initiates a synchronization, the database 78 will not accept any of the task updates based on a rule that this record has already been completed. The workstation 33, either automatically or via action taken by a workstation administrator, may then issue or transmit a request for a "Recheck" to clarify the status of the field device. If a Recheck was assigned, the workstation 34 will track the results of this recheck list separately.

In one embodiment, synchronization causes all complete check lists (and the field devices to which they apply) to be removed from the portable computer 34. During the same synchronization, any new check lists assigned by an administrator may be automatically downloaded to the PDA so the technician can have further work. Deficiency lists, however, may be handled differently, in the sense that the system may be configured such that all technicians should have access to all deficiencies for the plant at all times, providing a continuous opportunity to monitor progress of the repair work. Other possible rules include how to handle attachments, such as digital images, that may consume large portions of the memory 52 of the portable computer 34. In one case, digital images and other attachments are removed from the portable computer 34 with each synchronization.

Any of the operations shown in FIG. 4 may be initiated at any time during implementation of the quality control routine, and are not limited to the order shown, which is solely for the purpose of ease in illustration. In fact, a digital image or other attachment may be added to the quality control data record at any time, such as in connection with the recordation of information relative to a deficiency.

Furthermore, any of the blocks shown in FIGS. 3 and 4 may be implemented at the same time. For instance, a synchronization may involve both data uploads and downloads, and synchronization may occur in the background at a predetermined times or intervals, while other blocks are being implemented.

It should also be noted that the display forms may appear differently depending on the project personnel involved. That is, the forms may be customized for the functions performed by the personnel. An auditor may, for instance, only be given the opportunity to view previously recorded quality control data, and not be given the option of recording new quality control data other than an auditor signoff indication. As a result, the auditor may use the portable computer 34 to review deficiencies, check lists, or hard copy file folders (loop folders), and report on the completeness of the documentation. To this end, the auditor may be assigned certain tags (e.g., via selective downloading from the database), and the auditor may review the documentation associated with those tags, whether or not at the field sites, and sign off and/or record deficiencies based on the results of the review. To sign off on the documentation for a tag, the auditor may be provided in a display form a signature location available only to an auditor. Generally speaking, the database may store audit-related quality control data in a manner that permits the easy generation of audit reports.

Figure 5:
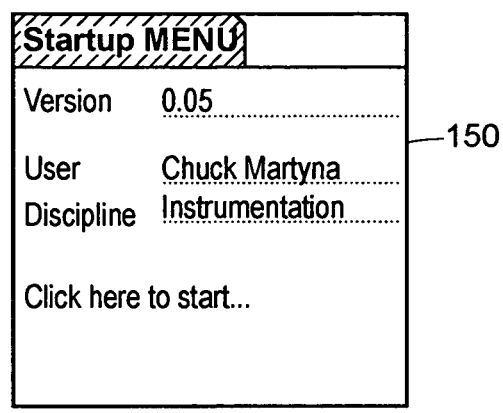
FIG. 5 is an exemplary portable computer screen display of a startup display form presented via a user interface of the portable computer of FIGS. 1 and 2 and used in connection with the data collection and transmission routines of FIG. 4.

FIGS. 5-11, 12a-c, and 13a-c depict exemplary graphical displays and/or display forms that may be generated in accordance with the disclosed method and system and in connection with the implementation of the quality control routine executed on the portable computers 34. In particular, FIG. 5 depicts a startup menu that identifies contextual information, user information, and any other information relevant to the assignment or issuance of the portable computer that should be verified prior to proceeding into the plant or to the field sites. To reach this menu, a user may have to select (i.e., initiate the execution of) a software application, such as the aforementioned forms software package.

FIG. 6 depicts a main menu 152 that provides the tag search or filtering option described above. The form displays a respective data entry field for each filter criterion, each of which may display "Unassigned" prior to such entry. Selecting one of the unassigned items may provide a list, in drop-down or other fashion, of items from which the user can select. Once the filter criteria are specified, the user may select equipment, i.e., a tag, from the list made available at the "Select One" field.

Figure 7:
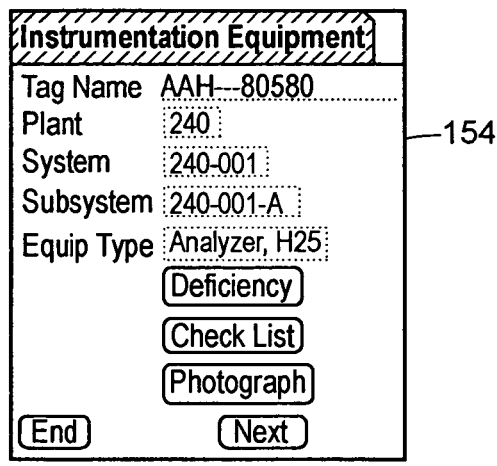
FIGS. 7 and 8 are exemplary portable computer screen displays of an equipment specification display form presented via a user interface of the portable computer of FIGS. 1 and 2 and used in connection with the data collection and transmission routines of FIG. 4.

FIG. 7 depicts an equipment specification form 154 displayed to a user once a tag has been selected. The equipment form 154 displays the specification data associated with the tag. The technician may then use this form, as well as subsequent forms, to "as-built" the specification data. For example, if the any of the fields shown in FIG. 7 display incorrect data, the technician may enter corrections and modifications for recordation in the portable computer as well as the project database. As shown in the form 154, the technician may add a deficiency, review the check list, or add a photograph or other attachment by selecting the available button.

Figure 8:
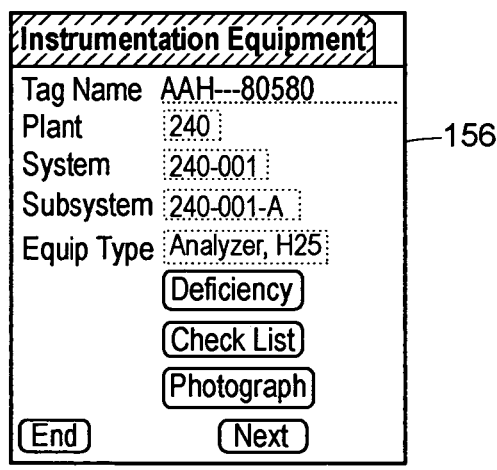

FIG. 8 depicts a second equipment specification form 156 that may be reached by selecting the "Next" button displayed on the form 154. In the exemplary embodiment shown in the figures, the two forms happen to display the same fields, but this of course need not be the case. In any event, after the specification data has been verified, the technician or other user (such as auditor) may select "Check List" to proceed to the display form depicted in FIG. 9.

FIG. 9 depicts a checklist display form 158 that lists the tasks to be performed in connection with this equipment type, and/or with this particular tag. To view the details and other information associated with each task shown in the list, selecting the task causes a task form 160 (FIG. 10) to be displayed. More generally, the right column of the form 158 provides status or progress information in connection with each task, which can be modified or entered via the form 160. The form 160 may include multiple pages, navigation to which may be accomplished via selection of arrow keys or other navigation tools. The form 160 depicts the first page in connection with an inspection. To record a result, the user selects the result field and enters the information or chooses a predetermined response from a drop-down or other list. At any point in viewing these checklist task items, a deficiency (i.e., deficiency information) or a photograph (or other attachment) may be added via selection of the appropriate button. A notes field also provides the user with an opportunity to enter or view long form notes associated with the task. More generally, the form 160 provides a technician with the option of entering or recording comments in connection with any task.

FIG. 11 depicts a signoff display form 162 that may be made available only when all the tasks have been completed. The form 162 may, more particularly, be displayed after a user selects a sign-off button that appears after all of the tasks have been completed. Selection of the "Signed Off By" and other fields shown provides the user with an opportunity to record a username, date and signature. Selection of the "Done" button may return the user to the main menu or, alternatively, the equipment specification form for the selected tag.

FIGS. 12a-c depict display forms associated with recording deficiencies. Specifically, FIG. 12a depicts a form 164 that permits a user to add or view a deficiency by selecting the deficiency button, which causes a form 166 (FIG. 12b) to be displayed, which generally provides fields for entering a description of the problem. Selecting a "Next" button takes the user to a form 168 (FIG. 12c) that provides a number of other fields for classifying and characterizing the deficiency. For example, a criticality level, date, desired completion date, and responsibility assignment may be entered. These fields may be very useful for organizing and displaying project-wide information later during the generation of status and other reports.

FIGS. 13a-c depict display forms associated with recording attachments, such as photographs, as quality control data associated with a deficiency, a checklist task, or a tag more generally. Specifically, a form 170 (FIG. 13a) provides an "Add" button that may selected, after which the camera may be activated. FIGS. 13b and c depict form 172 and 174 that provide instructions to the user for managing the attachment process. In following this process, the user implements a portion of the data collection routine executed by the portable computer 34 that automatically assigns a unique identification number to the image and stores the image with the other quality control data stored in connection with field equipment or tag number.

Generally speaking, each portable computer 34 issued to technicians and other personnel facilitates the generation and recordation of quality control data in accordance with the procedures standardized and automated by the above-described form displays. Through repeated and/or continuous data synchronizations, the aggregation and integration of this quality control data in the master database 78 storing project history information then provides a quality control due diligence service in connection with commissioning and other plant initiation projects. In other words, the automated data collection and subsequent integration into the database 78 generates and provides a comprehensive corporate audit trail for the project. It is comprehensive in the sense that evidence of all commissioning and other procedures that were conducted are recorded, as well as because the quality control data also includes all other documentation relevant to quality control, including piping and instrumentation drawings (P&IDs), location drawings, loop drawings, datasheets, and the quality control check lists used during commissioning, including comments made during the commissioning that may be useful during future maintenance work. In the audit trail, each deficiency is rated by level of criticality and tracked through to signoff.

Each host workstation or other computer having access to the project history database 78 may provide immediate and easy access to equipment information and project status. In the event that more than one workstation is involved, or if the host workstation is located remotely from the field site, another synchronization procedure may be used to integrate portions of the project history database 78 and otherwise maintain data integrity.

As mentioned previously, the workstation 33 implements database management software via a processor, one or more memories, a user interface having input/output functionality, and other components common to desktop or other personal computers. More particularly, the user interface presented by the database management software provides the capability to analyze the project history information on a number of levels (e.g., by field device, plant, system, etc.) and from a number of perspectives (e.g., deficiencies, personnel assignments, etc.). Furthermore, the software provides the capability of generating a number of reports regarding such information. Described hereinbelow are the various menus, forms, windows, and other items generated by the software for display via the user interface of the host workstation 33. For simplicity in description, and because the accompanying drawing figures are commonly referred to as "screen captures," each of these items are referred to as "display screens" although each item may be presented in any form via the user interface.

FIG. 14a depicts a display screen 180 generated by the host workstation 33 that generally permits the user to select a particular tag, or field device, for viewing the project history information associated therewith. For example, a number of criteria may be specified through drop-down or other menus, including the discipline (e.g., mechanical, electrical, etc.), system, and sub-system. In each case, as a criterion is selected, the software determines the appropriate choices to display in other drop-down menus by performing a filtering operation on the database 78. For example, as shown in FIG. 14a, only the equipment types found in Plant No. 240, System 240, Sub-System 240-001A will be made available in a drop-down menu 182. Once the Control Valve equipment type is selected, FIG. 14b shows that the user is given a number of tags from which to choose in a modified form of the display screen 180 having a drop-down menu 184.

The menus may be color-coded to indicate the level at which the criterion is relevant. For instance, the plant, system and sub-system criteria may be displayed with a first background color to denote group level criteria, while the equipment type and tag name criteria may be displayed with a second, differing background color to denote single-point level criteria. These color codes may be carried forward and applied throughout the displays and reports generated by the database management software.

Generally speaking, there is no limit to the number of disciplines, systems, etc. that may defined within the database 78.

Once a tag, system, sub-system, etc., has been selected, the user interface generated by the database management software may present the information relevant to the selection via a display screen 186 having a number of tabbed pages (e.g., Task Detail, Assign Tasks, Deficiencies, Specs, Tag Group, Reports), as shown in FIG. 15a. Selection of a "Task Detail" tab 188 causes the display screen 186 to present information directed to the current task status for the tag selected. For example, the information displayed may indicate how many re-checks have been assigned, completion status, and audit status. More generally, the display screen 186 includes a table 190 having a task heading column, a task description column, a result type column, a result column, and a notes column, for displaying information in rows specific to each task. Navigation buttons 192 and other typical windows management items (e.g., scroll bars) provide for navigation throughout the table 190. A button 194 provides the ability to insert new tasks, such that selection (i.e., actuation) of the button 194 causes a separate window or form to be displayed via the user interface for entry of items specifying the new task.

When a task (i.e., row) in the table 190 is highlighted or otherwise selected, information specific to the task is displayed below the table 190 (or alternatively in a separate form). Such information may include the re-check information noted above, as well as sign-off information. More particularly, portions 196 and 198 of the display screen 186 may display a technician and auditor sign-off signature and information related thereto.

The display screen 186 also includes a button 200 that provides an opportunity for an administrator or other database operator to mandate that a re-check be performed. Actuation of the button 200 will bring about the re-check via appropriate modification of the information displayed to the assigned technicians having the portable computers 34.

With reference now to FIG. 15b, selection of a tab 202 causes the display screen 186 to display a table 204 that allows the user to assign check lists to the technicians having the portable computers. To this end, the table 204 displays information for a number of tags, arranged in rows, that have met the filter criteria specified via the drop-down menus above the table 204 (see, e.g., FIG. 14a). Additional parameters may be available, such as "Assigned To." Similarly, a selection box 206 also allows the user to quickly filter for tags that are incomplete.

With reference now to FIG. 15c, selection of a tab 208 causes the display screen 186 to display a menu or form table 210 that specifies deficiency information relative to the selected tag. Such deficiency information corresponds with the deficiency information recorded via the portable computers 34, including a task description and solution, criticality, desired completion date, and sign-off information.

With reference now to FIG. 15d, selection of a tab 212 causes the display screen 186 to display a menu or form table 214 that specifies the specification as-built by the technician, and as recorded with the portable computer 34, for the tag selected. FIG. 15e depicts a display form 216 generated in response to the selection of a tab 218 and directed to enabling the database administrator or other user to group tags into loop numbers. Once a tag is assigned to a particular group via a form 220 having an "assign tag" selection button 222, the a form 224 displays all of the tags already assigned or associated with that group.

FIG. 15f depicts a display 226 generated in response to selection of a tab 228 for reports. The display 226 provides a number of selection buttons, each corresponding to a respective report that may be generated from the project history information in the database 78. The reports generally fall into three categories or types, i.e., Group, Other, and Single Point, based on the level of the information to be presented. For instance, at the group level, a report may be generated to show the current status of all check lists in the group of field devices that fall within the current selected group, which may be defined by the criteria shown and specified above, and which may be color coded to denote group criteria. In contrast, reports generated in response to the selection of one of the Single Point report buttons will present information targeting the current selected tag. Reports in the "Other" category cover miscellaneous topics, such as commissioning certificates, audit reports, and reports related to resource management. Resource management reports may generally present information directed to man-hour summaries and averages related to a specified group, system, sub-system, etc.

The disclosed technique and solution encompass the generation of a number different reports from the project history information stored in the database 78. The generation of the reports is automated and integrated with the quality control data collection process via the database management software. More particularly, the database management software may be configured to generate any type of report to display a selected portion of the project history information, including audit reports, hourly estimate reports, progress reports, commissioning certificates, check list reports, deficiency reports, and equipment details reports.

As a general example, the host workstation 33 may be used to generate a current status report that displays the percentage to which the project, and various aspects of the project, are complete. If the user would like progress information at a level higher than the equipment level (e.g., progress-by-system), then the information may be presented in the report, for each system or sub-system, etc., by a number of completed tags, a total number of tags, and a percent-complete designation. If the user would like progress information at an instrumentation level, then the report generated by the workstation 33 may show, for each tag, the number of hours spent, whether the instrumentation has been inspected, whether any deficiencies have been recorded, and whether the check list has been signed off as completed.

Such progress reports will be more accurate and current than reports generated in the past, inasmuch as the report generation capability is supported by the automated nature of the quality control data collection process provided by the portable computing tools. That is, the data collection process is contemporaneous with the report generation, and the automated synchronization of the portable computers 34 and the database 78 avoids introducing any delays in the process. Completely up to date reports can therefore be provided on-demand and in timely fashion. The data structure of the database 78 also supports progress reporting on a number of levels, including by system, plant, and tag status reports. Progress reports, as well as other reports, may be accessed or generated under restricted conditions, such that only certain personnel have access to certain information in the project database 78, and others of differing credentials have differing access or other authority with respect to such reports. For example, construction schedulers may have read-only access to status reports, while managers may have authority to create or modify status, progress and other reports after providing security information (e.g., username, password, and the like). Project reports may also be emailed using any one of a number of software packages interfaced with the disclosed system, including Adobe Writer.

One exemplary report may present person-hour estimations based on the quality control data and other information stored in the database. More particularly, the report may be an instrumentation person-hour summary that lists the hours spent on various systems, sub-systems, equipment types, or equipment. The hour totals may be derived from time estimates entered and recorded by respective technicians using the portable computers 34.

An audit report is another exemplary report that may similarly present information in summary fashion at a number of different levels (e.g., system, sub-system, etc.). In one case, the audit report identifies the number of tags audited in each area (e.g., sub-system), as well as the number of audit deficiencies recorded by the auditor(s).

Check list and deficiency reports may also be generated by the database management software implemented at the workstation 33. In these cases, the details of the quality control data recorded via the portable computers 34 may be presented and/or summarized for a selected tag. A check list report, for instance, may present the as-built specification information, the results of any inspections or procedures required by the check list, and information regarding the personnel responsible for completing or signing off the checklist. Deficiencies may also be identified on a check list report, but more detailed information may be presented in a deficiency report, such as the recordation date, deficiency type, the personnel recording the deficiency, deadline information, the date fixed, the personnel signing off on the solution, and a description of the solution. A deficiency report may provide such information for one or more deficiencies, as well as group all of the deficiencies for a selected group (e.g., system, sub-system, etc.). Another type of report that may be generated to present such detailed, tag-specific information is an instrumentation detail report. In fact, an instrumentation detail report may identify and describe each of the quality control and other actions taken with respect to a particular field device. Yet another type of report generated from the project database 78 and directed to tag-specific information is a commissioning certificate that may issued in connection with one or more deficiencies to be addressed. More particularly, the certificate may present a list of deficiencies and provide a signature block for a certification that the list has been reviewed and will be addressed by a commissioning team, an owner representative, or other personnel. The certificate may also present a section and signature block for system turnover, in which case a representative of the commissioning or quality control team may certify that commissioning or other work in connection with specified equipment has been completed with the exception of any outstanding deficiencies listed, and that the equipment has been inspected as conforming to design drawings, job specifications, regulatory agency rules, etc. This certification report or form may then be presented to the owner to document the point at which turnover to the owner occurs.

The information presented in the reports and, more generally, stored in the project database 78, may be used to produce a documentation library, which would provide resources in support of future maintenance work.

The information presented in the reports may also be provided to a maintenance management system, such as SAP, JD Edwards, and INtools. Such direct transmission of the relevant quality control data avoids the need for separate data entry after the commissioning procedures are completed.

As used herein, the term "quality control" should be understood to broadly refer to any work, procedure, or action directed to, involving, or related to, controlling quality in connection with a process plant, including without limitation checking, calibrating, inspecting and verifying that field equipment is installed and working to a level to which it was designed or intended. Quality control may also include a number of related measures, including without limitation the documentation or reporting of such work, procedures, or actions, or the results of such work, procedures, or actions. One benefit of the disclosed technique and solution is that the quality control measures implemented by the disclosed method or system provide comprehensive documentation in real-time, as well as consistency in the work, procedures, and actions taken.

As used herein, the term "host" should be understood to broadly refer to a computer, whether portable or not, that provides database and any other centralized or other services relied upon by the portable computers. A host computer may, in fact, be more than one workstation or personal computer, in the sense that the database may be decentralized or otherwise distributed across a number of communicatively coupled machines, and without regard to location or the manner in which they communicate.

The routines described herein may, of course, be implemented in a standard multi-purpose CPU or on specifically designed hardware or firmware as desired. When implemented in software, the software may be stored in any computer readable memory such as on a magnetic disk, an optical disk, or other storage medium, in a RAM or ROM of a computer or processor, etc. Likewise, this software may be delivered to a user or a device (such as the wearable computer) via any known or desired delivery method including, for example, on a computer readable disk or other transportable computer storage mechanism or over a communication channel such as a telephone line, the internet, etc. (which is viewed as being the same as or interchangeable with providing such software via a transportable storage medium).

While the disclosed technique and solution have been described with reference to specific embodiments, which are intended to be illustrative only and not to be limiting of the invention, it will be apparent to those of ordinary skill in the art that changes, additions and/or deletions may be made to the disclosed embodiments without departing from the spirit and scope of the invention. The foregoing description is given for clearness of understanding only, and no unnecessary limitations should be understood therefrom, as modifications within the scope of the invention may be apparent to those having ordinary skill in the art.

What is claimed is:

1. A method for providing quality control services in connection with a project for initiation of a process plant wherein field devices are disposed at respective field sites in the process plant, the method comprising:

generating quality control data at the field sites with a portable computer in response to quality control task information provided via a user interface of the portable computer;

transmitting, from the portable computer, the quality control data to a host computer having a database with initiation project history information wherein the initiation of a process plant includes phases leading up to normal, live operation of the process plant; and storing the quality control data in the database of the host computer by integrating the quality control data with the initiation project history information in the database.

2. The method of claim 1, further comprising storing the quality control task information in a memory of the portable computer to enable quality control work at the field sites.

3. The method of claim 2, wherein the quality control task information comprises a check list for each respective field device, and wherein the check list is stored in the memory of the portable computer in association with equipment specification data for each respective field device.

4. The method of claim 3, wherein generating quality control data comprises entering comment data via the user interface for storage in the memory of the portable computer in connection with a task specified in the respective check list.

5. The method of claim 3, wherein generating quality control data comprises modifying the equipment specification data stored in the memory of the portable computer upon visual inspection of the field device.

6. The method of claim 3, further comprising using the portable computer to select a respective field device by searching the memory of the portable computer based on one or more initiation project criteria selected from the group consisting of plant, system, subsystem, equipment type, and equipment tag name.

7. The method of claim 3, wherein generating quality control data comprises selecting a task from the check list for a respective field device and entering deficiency information associated with the task via the user interface for storage in the memory of the portable computer.

8. The method of claim 3, wherein generating quality control data comprises entering, via the user interface for storage in the memory of the portable computer, an indication that each task shown in the check list for a respective field device has been completed such that the quality control data comprises a signoff indication for the respective field device.

9. The method of claim 1, wherein the quality control data comprises a digital image of the respective field device such that generating quality control data comprises storing the digital image recorded by a digital camera of the portable computer in a memory of the portable computer.

10. The method of claim 9, wherein storing the digital image is performed in connection with a quality control problem such that the quality control data further comprises textual description of the quality control problem.

11. The method of claim 1, wherein the storing the quality control data comprises synchronizing the quality control data with the initiation project history information such that the quality control data overwrites portions of the initiation project history information for a respective field device.

12. The method of claim 11, wherein synchronizing the quality control data comprises exporting deficiency information stored in the database in association with respective field devices to a memory of the portable computer such that the deficiency information becomes a portion of the quality control task information available for display via the user interface of the portable computer.

13. The method of claim 11, wherein synchronizing the quality control data is implemented in accordance with rules specifying conditions under which the quality control data may overwrite portions of the initiation project history information for a respective field device.

14. The method of claim 1, wherein the initiation project comprises a commissioning project wherein the method further comprises utilizing the commissioning history information in a preventative maintenance system used during subsequent operation of the process plant.

15. The method of claim 1, wherein transmitting the quality control data comprises establishing communication between the portable computer and the host computer via an Internet connection.

16. A method of using a portable computer to facilitate quality control in connection with a project for initiation of a process plant wherein the initiation of a process plant may include phases leading up to normal, live operation of the process plant and wherein having a field device disposed at a field site in the process plant, the method comprising:

displaying a quality control check list on a user interface of the portable computer at the field site;

recording quality control data at the field site via the user interface by storing the quality control data in a memory of the portable computer;

transmitting the quality control data from the portable computer to a host computer for quality control in connection with the initiation project which includes phases leading up to normal, live operation of the process plant; and, storing the quality control data in a database of the host computer by integrating the quality control data with initiation project history information in the database.

17. The method of claim 16, further comprising storing the quality control check list in the memory of the portable computer in association with equipment specification data for the field device.

18. The method of claim 17, wherein recording quality control data comprises modifying the equipment specification data stored in the memory of the portable computer upon inspection of the field device.

19. The method of claim 16, further comprising entering search criteria via the user interface to search the memory of the portable computer to select the field device wherein the search criteria are selected from the group consisting of plant, system, subsystem, equipment type, and equipment tag name.

20. The method of claim 16, wherein recording quality control data comprises entering deficiency information associated with the field device via the user interface for storage in the memory of the portable computer.

21. The method of claim 16, wherein recording quality control data comprises entering, via the user interface for storage in the memory of the portable computer, an indication that each task shown in the quality control check list has been completed such that the quality control data comprises a signoff indication for the field device.

22. The method of claim 16, wherein the quality control data comprises a digital image of the field device such that recording quality control data comprises actuating a digital camera of the portable computer.

23. The method of claim 16, wherein storing the quality control data comprises synchronizing the quality control data with the initiation project history information such that the quality control data overwrites a portion of the database associated with the field device.

24. The method of claim 23, wherein synchronizing the quality control data is implemented in accordance with rules specifying conditions under which the quality control data may overwrite portions of the database associated with the field device.

25. The method of claim 23, wherein synchronizing the quality control data comprises exporting deficiency information stored in the database in association with the field device to the memory of the portable computer such that the deficiency information is available for display via the user interface of the portable computer in connection with the quality control check list.

26. The method of claim 16, wherein the initiation project comprises a commissioning project such that the initiation project history information comprises commissioning history information, and wherein the method further comprises utilizing the commissioning history information in a preventative maintenance system used during subsequent operation of the process plant.

27. The method of claim 16, wherein transmitting the quality control data comprises establishing communication between the portable computer and the host computer via an Internet connection.

28. A portable computer for quality control in connection with a project for initiation of a process plant wherein having field equipment at a field site, the portable computer comprising:
 a user interface suitable for operation at the field site;
 a processor communicatively coupled to the user interface;
 a memory with initiation project history information which includes information from phases leading up to normal, live operation of the process plant communicatively coupled to the processor;
 a data collection routine stored in the memory and adapted for execution by the processor to display via the user interface a quality control check list for the field equipment and to store in the memory quality control data entered via the user interface and in accordance with the quality control check list; and,
 a data transmission routine stored in the memory for execution by the processor to deliver the quality control data from the memory to a host computer for recordation in the host computer's database by integrating the quality control data with initiation project history information in the database.

29. The portable computer of claim 28, wherein the data transmission routine is executable to retrieve equipment specification data associated with the field equipment in connection with the quality control check list.

30. The portable computer of claim 28, further comprising a communications port for wireless transmission of the quality control check list to another portable computer at the field site.

31. The portable computer of claim 28, wherein the user interface comprises a digital camera such that the quality control data comprises a digital image.

32. The portable computer of claim 28, further comprising a wireless communication transceiver such that the quality control data is delivered via an Internet connection.

33. The portable computer of claim 28, wherein the data collection routine provides via the user interface a prompt for check list signoff such that the quality control data comprises a signoff indication that the quality control check list has been fully completed.

34. The portable computer of claim 28, wherein the data collection routine provides via the user interface a form for entering deficiency information indicative of a problem encountered during action taken in accordance with the quality control check list.

35. The portable computer of claim 34, further comprising an audio recorder communicatively coupled to the processor such that the data collection routine provides via the user interface an option to record audio clips as the deficiency information.

36. A system for quality control in connection with a project for initiation of a process plant wherein having field equipment at field sites in the process plant, the quality control system comprising:
 a host computer having a database with initiation project history information which includes information from phases leading up to normal, live operation of the process plant;
 a portable computer configured for communication with the host computer and having a user interface, a processor coupled to the user interface, and a memory coupled to the processor for execution of a quality control routine stored in the memory;
 wherein the quality control routine comprises a data synchronization routine to download, from the database to the memory, respective quality control check lists and equipment specification data for the field equipment and a data collection routine to record in the memory quality control data entered via the user interface in accordance with the quality control check lists, wherein the data synchronization routine uploads the quality control data from the memory for storage in the database by integrating the quality control data with the intiation project history information.

37. The system of claim 36, wherein the data collection routine comprises a deficiency recordation routine to enter, via the user interface, deficiency information associated with a task specified in the quality control check list.

38. The system of claim 37, wherein the deficiency recordation routine provides an opportunity to enter, via the user interface, an indication that the task has been completed.

39. The system of claim 38, wherein the host computer comprises a database management routine to generate reports from information set forth in the database, and wherein the reports include a deficiency management report derived from the deficiency information and indication entered via the deficiency recordation routine.

40. The system of claim 36, wherein the portable computer comprises a transceiver such that the host computer and portable computer communicate via an Internet connection.

* * * * *